US012634029B1

(12) United States Patent
Ridoux et al.

(10) Patent No.: US 12,634,029 B1
(45) Date of Patent: May 19, 2026

(54) ESTIMATING AND COMPENSATING FOR HARDWARE CLOCK DRIFT BASED ON SYNCHRONIZATION SIGNALS

(71) Applicant: Amazon Technologies, Inc., Seattle, WA (US)

(72) Inventors: Julien Ridoux, Seattle, WA (US); Scott Andrew Emery, Saratoga, CA (US); Joshua Benjamin Levinson, Seattle, WA (US); Tam Xuan Phan, Springfield, VA (US); Jacob Wisniewski, Seattle, WA (US); James Paul Rivers, Capitola, CA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 18/188,986

(22) Filed: Mar. 23, 2023

(51) Int. Cl.
H04J 3/06 (2006.01)
H04J 3/02 (2006.01)

(52) U.S. Cl.
CPC ............ H04J 3/0667 (2013.01); H04J 3/025 (2013.01)

(58) Field of Classification Search
CPC ................................ H04J 3/0667; H04J 3/025

USPC .......................................................... 370/503
See application file for complete search history.

(56) References Cited

U.S. PATENT DOCUMENTS

| | | | | | |
|---|---|---|---|---|---|
| 11,063,738 | B1 * | 7/2021 | Wang | .................... | H04L 7/0008 |
| 2019/0235083 | A1 * | 8/2019 | Zhang | ................... | G01S 7/4808 |

* cited by examiner

*Primary Examiner* — Faisal Choudhury
(74) *Attorney, Agent, or Firm* — Knobbe, Martens, Olson & Bear, LLP

(57) ABSTRACT

The present disclosure generally relates to systems and methods for estimating and compensating clock period drift of a hardware clock of a node in a timing network. In some implementation examples, a node generates a plurality of time stamps based on a plurality of synchronization signals received from an upstream node according to the hardware clock, where each of the plurality of time stamps records a point in time at which each of the plurality of synchronization signals is received according to the hardware clock. The node selects two subsets of time stamps from the plurality of time stamps, and then selects one time stamp from each of the two subsets based on a curve that fits time stamps in each of the two subsets. The node calculates an estimated period of the hardware clock based on two time stamps selected.

20 Claims, 8 Drawing Sheets

ESTIMATING AND COMPENSATING FOR HARDWARE CLOCK DRIFT BASED ON SYNCHRONIZATION SIGNALS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources and data accessible to users of the data center. The data centers may be private data centers operated on behalf of an organization or public data centers operated on behalf, or for the benefit of, the general public.

In some cases, multiple host computing devices (either virtual or physical) may be interconnected to provide desired functionality. Such devices may be referred to as "distributed," such as by implementing a distributed service or a distributed computing environment. One challenge that often occurs in distributed computing (and in various other computing contexts) is the difficulty of creating a shared notion of time. It may be desirable to use time information to implement various policies in a computing service, such as considering a first of multiple conflicting requests as authoritative. However, in the context of distributed computing systems, each device may have an independent notion of time, and as such it may be difficult or impossible to determine which of a set of conflicting requests actually occurred first. A variety of techniques exist to attempt to synchronize time between networked computers. For example, the Network Time Protocol (NTP) enables computing devices to communicate with a reference timekeeper over a network and receive a current time. These techniques are typically not sufficiently accurate, or are too complex to implement in wide-scale distributed computing platforms, particularly hosted computing platforms.

DETAILED DESCRIPTION

Figure 1:
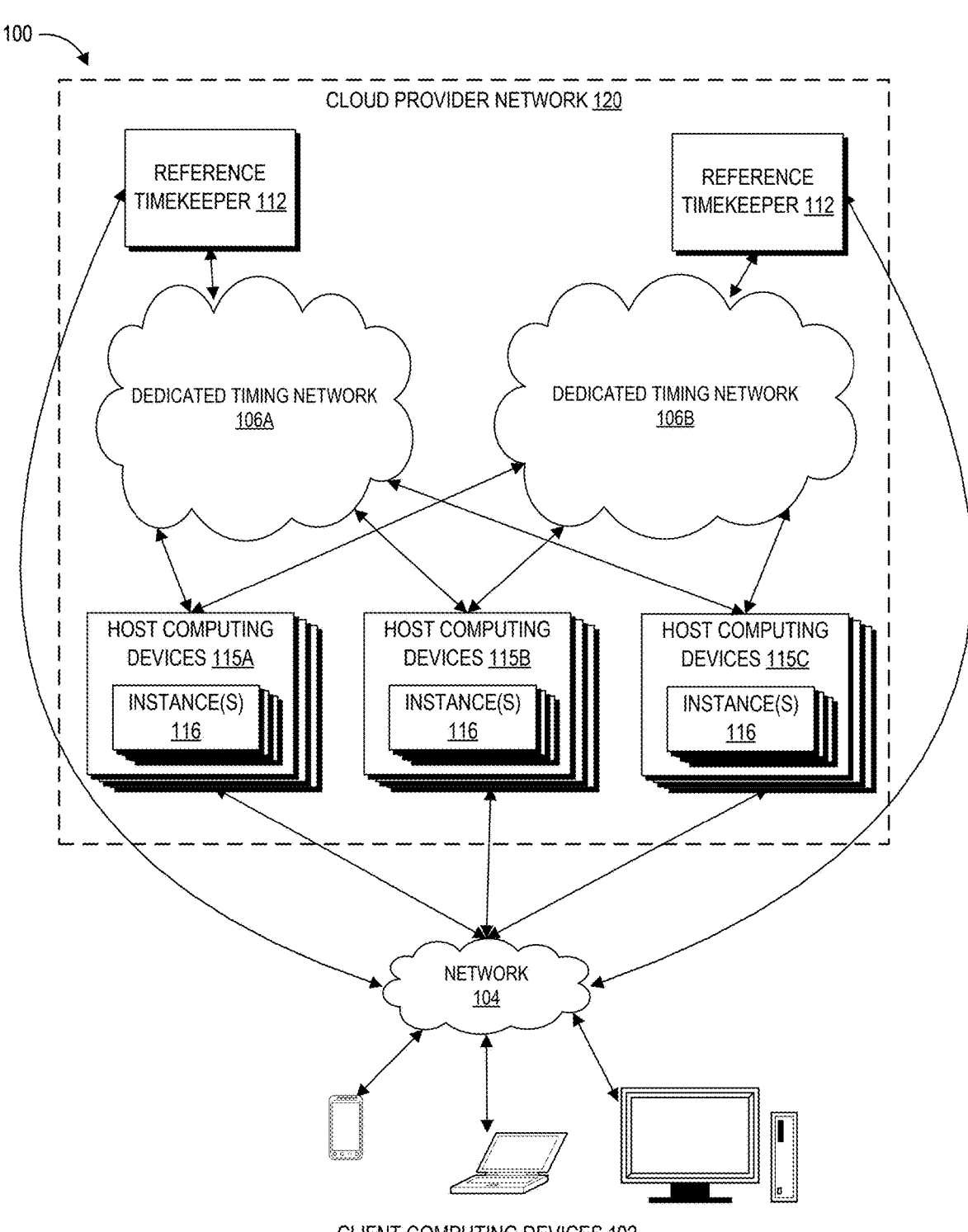
FIG. 1 depicts an example computing environment including a cloud provider network in which embodiments of the present disclosure can be implemented to provide highly accurate time information to host computing devices by use of a dedicated timing network.

Generally described, aspects of the present disclosure relate to systems and methods for maintaining synchronized timing among nodes in a dedicated timing network through estimating and compensating clock cycle drifts associated with local oscillators of nodes in the dedicated timing network. As disclosed herein, a dedicated timing network can include a series of nodes, such as arranged within a tree, configured to provide highly accurate timing information to downstream computing devices (such as computing & storage resources in a distributed network such as a cloud provider network) to facilitate computing operations, such as distributed computing functionality. To support such operations, it may be desirable for the timing information provided by the dedicated timing network to be as accurate as possible. However, the timing information available at any given node may contain inaccuracies. Moreover, it may be difficult or impossible to determine the direction and magnitude of such inaccuracies at an individual node without requiring reference to perfect information, which each node may lack.

Embodiments of the present disclosure nevertheless enable measurement and accounting for inaccuracies by combining information from different timing sources known or expected to be inaccurate. Specifically, as disclosed herein, nodes within a dedicated timing network may have two sources of timing information: a local oscillator that attempts to keep time via oscillation of known frequency and a fixed-width timing signals (such as pulse-per-second, or "PPS," signals) obtained via a timing network. Both sources may be assumed to have some inaccuracy. For example, the frequency of a local oscillator may be known to "drift" higher or lower according to environmental factors, such as temperature, voltage or the like. The frequency of signals obtained via the timing network may be known to vary according to network conditions, such as latency, asymmetric communications, the accuracy of a network device, and the like. Embodiments of the present disclosure can nevertheless utilize information from both sources to establish inaccuracy in one of the sources. Specifically, as disclosed herein, variance in network timing information, as measured in terms of a local oscillator, may be used to measure drift of a local oscillator in order to compensate for this drift. The compensated local oscillator measurement of time may in turn be used to measure the accuracy of network signals, or to maintain accuracy of network signals propagated from the node. In this way, multiple sources of known or expected inaccurate timing information can be used to increase accuracy of timing information at a node.

As noted above, many sources of timing information available at a computing device can be known or expected to be inaccurate. While these inaccuracies may be trivial in non-computerized environments (as human interactions are rarely concerned with microsecond differences in notions of time), they can create significant problems in computerized environments. For example, computerized transaction handling may be required to address conflicting, near-simultaneous transactions. In a distributed system, various complex techniques must be adopted to attempt to address such transactions, as merely using a "transaction time" at each distributed device may introduce unexpected results given potentially different notions of time at each device. Similarly, some computer applications, such as handling of financial transactions, demand highly accurate timestamping, which in turn requires highly accurate time on a device. One mechanism for addressing these problems would be to equip every computing device with a highly accurate reference timekeeping device. For example, each device may have installed within it an atomic clock, which is manually synchronized with an initial reference point (e.g., by physically co-locating the atomic clock and the reference point). Alternatively, each device may have installed a global navigation satellite system (GNSS) receiver configured to determine a present time by reference to a GNSS. Neither approach is feasible at large scale, both due to the cost and complexity of these time keeping devices and the logistical problems with setting up and maintaining such devices.

One large scale application where accurate timing information may be desired is in hosted computing environments, sometimes referred to as "cloud computing" environments. One tenant of such environments is hardware commoditization: users of such environments are often provided with a general outline of the hardware on which a hosted machine instance will execute, but are relieved of selecting and maintaining individual hardware. This provides for extreme flexibility—failure of a single set of hardware can be addressed, for example, by invisibly relocating a hosted machine instance to another set of hardware. In the context of cloud computing, time synchronization becomes particularly problematic, as hosted computing environments often span multiple data centers within a given geographic region and multiple geographic regions around the globe. If such environments attempt to provide synchronization among all hosted machine instances, there may be an expectation that such synchronization does not depend on the particular hardware hosting the instance, the particular location of that hardware, or the like. Accordingly, given the limitations to time synchronization noted above, providing accurate time information across a hosted computing environment is very difficult.

Attempts have been made to provide for synchronized time information in distributed computing systems. For example, U.S. patent application Ser. No. 17/643,785, filed on Dec. 10, 2021 and titled "HIGHLY ACCURATE TIME INFORMATION IN HOSTED MACHINE INSTANCES USING DEDICATED TIMING NETWORK", the entirety of which is hereby incorporated by reference, describes use of a dedicated timing information network to propagate timing information from a highly accurate reference timekeeper device, such as a GNSS-connected timing device. The reference timekeeper device may transmit a PPS signal (or other fixed-width signal) via the dedicated timing network, which may thus be broadcast to receiving devices on the network simultaneously to indicate the occurrence of a given point in time (e.g., the beginning of each new second). The dedicated timing network can be configured to maintain extremely high level of accuracy for the timing information, potentially on the order of nanoseconds. A set of host computing devices may include hardware that interfaces with and receives the signal from the dedicated timing network, thus facilitating synchronization between the host computing device and the reference timekeeping device and enabling wide-scale time synchronization.

One concern that arises when implementing a dedicated timing network is that nodes in the network may themselves be subject to inaccuracies. That is, the accuracy of timing information propagated through the network may be dependent on the accuracy of timing information available at individual nodes. As an illustration, consider that a PPS signal may be intended to indicate a specific point in time, such as the beginning of a new second (e.g., the time interval between two consecutive PPS signals is one second, and each signal is received at the occurrence of a new second). However, such a signal cannot propagate through a network with infinite speed. Thus, nodes within a network may be required to compensate for network delays by, for example, sending out a downstream PPS signal before an upstream PPS signal is received (e.g., with the intent that a downstream device obtains the downstream PPS signal simultaneously to the node receiving the upstream PPS signal). To conduct such compensation, a node itself can be required to maintain local knowledge of time. However, like other devices, the node may have access only to known or expected inaccurate information. For example, when attempting to anticipate a next PPS signal, the node may be reliant on a local oscillator with known or expected variance in frequency.

A potential solution to this problem may be to utilize the PPS signals to directly estimate variance in oscillator frequency, such as by utilizing a clock counter to calculate the period of the oscillator clock. More specifically, a node may set a clock counter that increments according to the oscillator cycles. For example, the clock counter may count once whenever the oscillator completes a cycle. When a synchronization signal (such as a PPS signal) is received, the node may record a corresponding clock counter value (denoted as N1) at that moment. When a second consecutive PPS signal is received, the node may record another corresponding clock counter value (denoted as N2) at that moment. By simply subtracting N2 and N1, and then taking the inverse of the difference of the subtraction, the period of the oscillator clock can be estimated. However, this solution may perform poorly because noise associated with the network (e.g., variation of network delay or jitter) may overwhelm any "signal" of clock drift. That is, the inaccuracy of a PPS signal may limit the ability of a node to directly utilize that signal to directly estimate oscillator drift.

To address at least some of the above problems, embodiments of the present disclosure provide for increased accuracy at a node using multiple forms of known or expected inaccurate timing information by combining that information in a manner that reduces the expected contribution of inaccuracy form each source. Specifically, while both network timing information and local oscillator clock drift may cause inaccuracy in timing information, the scale and variance of inaccuracy tends to differ between these two sources. Drift within a local oscillator often has relatively low variance over relatively short periods of time-rather, error tends to grow over time in a certain direction based on external factors (like temperature). For certain scales, error can often be approximately linearly (e.g., growing at a constant rate over a given period). Conversely, network timing information can often have high variance of relatively short periods of time, as factors such as network congestion can cause rapid changes in error magnitude and direction. Embodiments of the present disclosure can leverage these two different types of inaccuracy to provide timing information with higher accuracy than is provided by either source of time information alone. Specifically, embodiments of the present disclosure can provide for estimating oscillator drift using a statistical analysis of network timing information, which statistical analysis minimizes the short-term variance in network timing information to more accurately estimate the longer-term variance in oscillator drift.

In some embodiments, statistical analysis is performed on PPS signals received from upstream node(s) to estimate local oscillator drift. More specifically, for each of the received upstream PPS signals, a local node may generate a time stamp associated with a corresponding PPS signal and record the time stamp. The time stamp may be a clock counter value counted by a local clock counter and the clock counter may count once whenever a local oscillator of the node completes a cycle. As such, each time stamp may be a positive integer that represents a relative timing a particular PPS signal is received by the (local) node. Then, the node may select a set of time stamps for subsequent statistical analysis, where the set of time stamps may include N time stamps with N being a positive integer. The value of N may affect the performance of the statistical analysis and determining the value of N may depend on rate of oscillator drift and network noise/jitter that affects when PPS signals are received. More specifically, the value of N may be chosen to be large enough such that effect of the local oscillator drift can dominate or outweigh the effect of network noise/jitter. At the same time, the value of N may also have to be small enough that the oscillator drift can still be approximated using statistical techniques, such as linear or non-linear approximation. In other words, the network noise may set a lower limit for the value of N and the rate of oscillator drift may set an upper limit on the value of N. Additionally, for robustness of the statistical analysis that will be made clear later, the N time stamps selected can be further divided into several subsets of time stamps. For example, the N time stamps may be divided into four subsets, where each subset has N/4 time stamps. In other examples, the N time stamps may be divided into three, five, six or other numbers of subsets. In the example of having four subsets, the N/4 time stamps in each subset can be represented on a two-dimensional (2D) plane, where the x-axis represents the order a particular time stamp is received and the y-axis represents the corresponding clock counter value.

As used herein, the term "local node" may refer to any nodes in a dedicated timing network in which a local oscillator resides. The statistical analysis described herein can be implemented on the local node to estimate clock drift of the local oscillator that can be considered as a part of the local node. An upstream node may refer to another node (distinct from the local node) in the dedicated timing network from which the local node receives PPS signals. A downstream node may refer to another node (distinct from the local node and the upstream node) in the dedicated timing network to which the local node transmits PPS signals.

Theoretically, time stamps within a subset may be approximated as a straight line on the 2D plane having a constant slope, the slope being inverse to a theoretical period of the local oscillator. In reality, because of the presence of network delay and local oscillator drift, time stamps within a subset may not form a straight line having a constant slope. Rather, when N is well-chosen (e.g., not too large), the time stamps within a subset may scatter around a hypothetical straight line, the hypothetical straight line having a slope that is inverse to the actual oscillator clock period around the corresponding period of time. A time stamp that is exactly on the straight line then can be indicative of the actual oscillator period at the moment due to oscillator drift. To find this hypothetical straight line that approximates the time stamps of a subset, linear regression techniques can be utilized. Based on linear regression, a linear curve can be generated on the 2D plane and the time stamp that has the minimum distance to the linear curve can be chosen as a desired time stamp that best reflects the actual oscillator period. In the context of curve fitting, a linear curve is a curve that has a linear dependence on the curve parameters. Based on the desired time stamps selected from a subset or subsets, period of the local oscillator clock can be estimated. In some embodiments, linear regression may be performed on some or all of the subsets. In the example of having four subsets, though there are four subsets, the local node may select only some of the subsets, such as the left-most subset (i.e., the subset that is received first) and the right-most subset (i.e., the subset that is received last) on the x-axis, to perform linear regression for generating desired time stamps. By picking the right-most and left-most subsets for linear regression analysis, a reasonable distance between the eventually picked desired time stamps can be maintained such that network noise will not dominate oscillator drift when estimating oscillator period. Further, by dividing the N time stamps into three, four, five, six or other appropriate number of subsets, a sufficient number of time stamps can be available to be chosen from each subset such that an "outlier" time stamp does not have to be chosen. As such, there may be two desired time stamps selected and the period of the local oscillator clock can be estimated based on the clock counter values and orders of the two desired time stamps. More specifically, the desired time stamp in the left-most subset may be a clock counter value of P and correspond to the i-th received PPS signal, and the desired time stamp in the right-most subset may be a clock counter value of Q and correspond to the j-th received PPS signal. Then, the estimated local oscillator clock period can be calculated using the formula: $1/((Q-P)/(j-i))$.

Advantageously, the estimated clock period that reflects oscillator drift can be useful in several aspects, such as keeping track of time for a host computing device. An useful application of the estimated local oscillator period relates to scheduling a next PPS signal for downstream node(s) to achieve time synchronization among nodes in a dedicated timing network. Many computing devices utilize crystal oscillators to keep time. These oscillators, in theory, operate at a known frequency, and thus time can be measured or counted by the signals provided by the crystal oscillators. As indicated above, however, in practice the frequency of an oscillator varies based on several factors, such as temperature and voltage. For example, a specific oscillator can be set to run at a nominal frequency of 250 MHz. This means that the oscillator has a nominal period of 4 nanosecond. If the period is ideal and does not drift, time can be accurately scheduled by counting the cycles of the oscillator. For example, when a node receives a PPS signal from an upstream node, the node may rely on the oscillator to count one second and transmit a next PPS signal to a downstream node at the moment that one second is counted. Assuming there is no network delay between the downstream node, the node and the downstream node will observe the arrival of PPS signals at the same time. However, in practice the oscillator may have a frequency variation of +/−45 ppm, meaning that the oscillator may accumulate up to 45 microseconds of period drift for each second. In other words, if a node relies on this oscillator to count one second, the time the node actually gets can be earlier up to 0.999955 second or later up to 1.000045 second; and the node may transmit the next PPS signal earlier or later than the node should. Thus, a downstream node may observe the arrival of the PPS signal earlier or later by up to 45 microseconds than the node. By estimating the period deviation of the crystal oscillator through above signal processing steps, the node can use the estimated period of the crystal oscillator to more accurately schedule the next PPS signal even if the crystal oscillator is susceptible to certain level of frequency variation that might be specified in the hardware specification. Notably, the number (i.e., N mentioned above) of the set of time stamps selected can be determined based on the frequency variation specified in the hardware specification of the crystal oscillator. For example, when the frequency variation is greater, N might be chosen to be a smaller value such that the clock period drift can be more accurately estimated. On the other hand, when the frequency variation is less, N might be set larger. By selecting a proper number of time stamps for performing the signal processing based on hardware specification, the next PPS signal can be transmitted at a time instant such that the nodes downstream and upstream in the dedicated timing network perceive the arrival of the PPS signals simultaneously. Therefore, synchronized operation among the nodes and host computing devices can be achieved through the broadcast of PPS signals.

Another specific use case of the present disclosure relates to dealing with network delay, in particular, scheduling a next PPS signal for downstream node(s) in the presence of network delay. As noted above, one source of error in timing at an individual computing device is delay during transmission of the information from one device to another. For example, if the round-trip latency between a node and a downstream node is 10 microseconds and a network is configured to be (as much as possible) symmetrical, the node may adjust the signal by 5 microseconds to account for network latency between the reference timekeeping device and the other device. Assuming the network delay can be obtained by the node (e.g., through sharing timing information data), the node may schedule the next PPS signal earlier by 5 microseconds to account for the network delay such that the node and the downstream node may perceive the arrival of PPS signals simultaneously. However, if node has inaccurate timing information, it may be unclear as to what constitutes 5 microseconds. For example, when the crystal oscillator of the node has clock period drift, the node may not know what constitutes 5 microseconds based on counting the clock cycles of the crystal oscillator. Thus, the clock period drift may prevent the node from accurately accounting for network delay when scheduling the next PPS signal. By estimating the period deviation of the crystal oscillator through methods and systems disclosed in the present disclosure, the node can use the estimated period of the crystal oscillator to more accurately count the network delay and, therefore, schedule the next PPS signal to transmit to the downstream node(s) at more accurate timing. More specifically, immediately after receiving a PPS signal from an upstream node, the node may start counting one second minus the network delay for scheduling the next PPS signal to be transmitted to downstream nodes. When the estimated period accurately reflects the period of the crystal oscillator, the network delay can be more accurately counted. For example, assuming the network delay is d second(s) and the estimated period of the crystal oscillator is p (t) (i.e., the estimated period may vary and may be a function of time), the node can divide d by p (t) to derive how many clock cycles correspond to the network delay. Also assuming the counter value corresponding to the time instant when the PPS signal is received from the upstream node is $C_{rcv}$, then the node may schedule the next PPS signal at the time instant when the counter value equals $C_{rcv}+1/(p(t))-d/(p(t))$, where $1/(p(t))$ represents the number of an estimated clock cycle that make up one second. Thus, by estimating the clock period of the local oscillator, the present disclosure maintains time synchronization among nodes of a dedicated timing network under the presence of network delay.

In some embodiments, methods and systems that are presently disclosed further include filtering unwanted PPS signals and excluding the unwanted PPS signals from the estimation of the clock period drifts. More specifically, in conjunction with the above disclosure, the filtering may be performed on each of the selected subsets of time stamps so that unwanted PPS signals will not be used for generating linear regression curve. The unwanted PPS signals may be identified based on different criterions or combinations thereof. One criterion relates to the time difference between a PPS signal received from one upstream node and another PPS signal received from another upstream node. A node in the dedicated timing network often receives PPS signals from two or more upstream nodes. Ideally, the PPS signal received from one upstream node and the corresponding PPS signal received from another upstream node should arrive at the node at the same time. In practice, the pair of PPS signals from two upstream nodes may not arrive at the same time due to hardware limitations. For a network that requires the PPS signals to be broadcasted to nodes that can be reached within 100 nanoseconds of a GNSS source and having a network depth of four levels, the arrival time of a pair of PPS signals should not differ more than 25 nanoseconds, which is about six clock cycles assuming the crystal oscillator has a nominal frequency of 250 MHz. Hence, if a pair of PPS signals are received by a node farther away from six clock cycles, this indicates that upstream nodes may disagree on their notion in time and the corresponding time stamps may be filtered out to be excluded from the estimation of the clock cycle drift. Another criterion relates to the leveraging hardware specification of the crystal oscillator to filter out unwanted PPS signals. As noted above, an example hardware specification of a crystal oscillator may provide that the crystal oscillator has a frequency deviation up to +/−45 ppm when operating at a nominal frequency (e.g., 250 MHz). This means that there may be up to +/−90 ppm period drift of the crystal oscillator during the reception of two consecutive PPS signals. Assuming an upstream node is perfectly synchronized and there is no other network delay variations from the upstream node to a local node, two consecutive PPS signals received by the local node may be separated in time between 0.999910 second and 1.000090 second. Hence, if the time difference between two consecutive PPS signals exceeds this range, it may mean that the timings of at least one of the PPS signals are not reliable. The time stamps corresponding to the unreliable PPS signals may then be excluded from the generation of linear regression model and from being selected as a desired time stamp for estimating period of the crystal oscillator. As such, hardware specification of the crystal oscillator may help improve the accuracy of the estimated clock cycle of the crystal oscillator by providing a criterion for filtering out potentially unreliable PPS signals for the purpose of time synchronization.

As will be appreciated by one of skill in the art in light of the present disclosure, the embodiments disclosed herein improve the ability of computing systems to provide highly accurate timing information signals (e.g., PPS signals) to achieve synchronized operations among computing devices. Moreover, the presently disclosed embodiments address technical problems inherent within computing systems; specifically, the limited ability of a computing device to keep track of time under hardware limitations such as oscillator frequency drifts and network delay. These technical problems are addressed by the various technical solutions described herein, including performing signal processing on received timing signals from upstream node(s) to estimate clock period of crystal oscillators, and scheduling the time instant that regenerated timing signals should be transmitted to downstream node(s) based on the estimated clock period. Thus, the present disclosure represents an improvement in dedicated timing network and distributed computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented to provide highly accurate time information to host computing devices 115A-115C by use of one or more dedicated timing networks 106A-106B. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The cloud provider network 120 can additionally offer a time synchronization service as described herein. The resources required to support the operations of such services (e.g., compute and storage resources) may be provisioned in an account associated with the cloud provider, in contrast to resources requested by users of the cloud provider network, which may be provisioned in user accounts.

The network 104 can include any appropriate network, including an intranet, the Internet, a cellular network, a local area network or any other such network or combination thereof. In the illustrated embodiment, the network 104 is the Internet. Protocols and components for communicating via the Internet or any other types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client computing device 102 can generally refer to any device accessing a network-accessible service as a client of that service.

In FIG. 1, the cloud provider network 120 includes sets of host computing devices 115, labeled as set 115A, 115B, and 115C in FIG. 1. Each set can represent a logical group of devices 115, such as a physical "rack" of devices. Each computing device 115 can support one or more hosted machine instances 116. Host machine instances 116 may be virtual machine instances, representing virtualized hardware (supported by underlying hardware of the devices 115) supporting, e.g., an operating system and applications. Hosted machine instances 116 may further represent "bare metal" instances, whereby a portion of the computing resources of the device 115 directly support (without virtualization) the instance 116. In some cases, an instance 116 may be created and maintained on behalf of a client. For example, a client may utilize a client computing device 102 to request creation of an instance 116 executing client-defined software. In other cases, instances 116 may implement functionality of the cloud provider network 120 itself. For example, instances 116 may correspond to block storage servers, object storage servers, or compute servers that in term provide block storage, object storage, or compute, respectively, to client computing devices 102. While block storage, object storage, and compute are example services, instances 116 can additionally or alternatively represent domain name services ("DNS") servers, relational database servers, servers providing serverless computing services, and other server services for supporting on-demand cloud computing platforms. Each host computing device 115 includes hardware computer memory and/or processors, an operating system that provides executable program instructions for the general administration and operation of that server, and a computer-readable medium storing instructions that, when executed by a processor of the server, allow the server to perform its intended functions. While not shown in FIG. 1, the cloud provider network 120 may include other computing devices facilitating operation of the host computing devices 115, such as data stores to store account information, computing devices to implement logging, monitoring, and billing services, etc.

The cloud provider network 120 can provide on-demand, scalable computing platforms to users through the network 104, for example allowing users to have at their disposal scalable "virtual computing devices" via their use instances 116 or services provided by such instances 116. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. As such, the cloud provider network 120 may be considered as a distributed computing system. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations, regional edge cache servers. This compartmentalization and geographic distribution of computing hardware enables the cloud provider network to provide low-latency resource access to customers on a global scale with a high degree of fault tolerance and stability. In some implementations, the cloud provider network can include one or more cellular networks managed and provided by the cloud provider. The elements shown in FIG. 1 illustratively represent a collection of elements present in a single region or availability zone. These elements may thus be replicated in each such region or availability zone.

As noted above, timing synchronization among host computing devices 115 are of high importance for distributed computing systems or "cloud computing" environments. One tenant of such environments is hardware commoditization: users of such environments are often provided with a general outline of the hardware on which a hosted machine instance will execute, but are relieved of selecting and maintaining individual hardware. This provides for extreme flexibility—failure of a single set of hardware can be addressed, for example, by invisibly relocating a hosted machine instance to another set of hardware. In the context of cloud computing, time synchronization becomes particularly problematic, as hosted computing environments often span multiple data centers within a given geographic region and multiple geographic regions around the globe. If such environments attempt to provide synchronization among all hosted machine instances, there may be an expectation that such synchronization does not depend on the particular hardware hosting the instance, the particular location of that hardware, or the like. Accordingly, given the limitations to time synchronization noted above, providing accurate time information across a hosted computing environment is very difficult.

Time synchronization among host computing devices 115 can be achieved by connecting the host computing devices 115 to one or more dedicated timing networks 106, denoted as networks 106A and 106B. Each dedicated timing network 106 is further connected to one or more reference timekeepers 112, which act as a point of reference for timing information delivered via the network. For example, each reference timekeeper 112 may be an atomic clock or a GNSS receiver, and may thus act as a source of highly accurate time information, which can be transmitted to host computing devices 115 within the network 120 through the dedicated timing network 106. In one embodiment, each different reference timekeeper 112 is synchronized to one another, and therefore shares to a high degree of accuracy a common time. For example, each timekeeper 112 may be synchronized to a common GNSS, such as GPS, with a high degree of accuracy (e.g., tens of nanoseconds).

Each dedicated timing network 106 can include an interconnected set of devices (e.g., nodes) configured to carry timing information from the reference timekeeper 112 to the host computing devices 115 with minimal loss in accuracy (e.g., on the order of nanoseconds). For example, the dedicated timing networks 106 may include devices configured to the specifications of the White Rabbit Project, a known project to develop highly accurate timing networks. In some embodiments, the dedicated timing network 106 may have tree-like structure and have nodes at different levels, where node(s) at the top level (i.e., closest to the reference timekeeper 112) may be referred as root nodes and node(s) at the bottom level may be referred to as leaf nodes. In some implementations, the dedicated time distribution network can be coupled between the GNSS receivers and every top of rack switch ("TOR") in a datacenter. To avoid issues of congestion or contention for network resources, each dedicated timing network 106 may be dedicated to timing information, and provide such timing information with little or no encoding. Alternatively, each dedicated timing network 106 may provide both timing information and other services concurrently. While shown in FIG. 1 as a distinct network, in some embodiments the dedicated timing network 106 and the network 104 may utilize a common but electrically partitioned physical substrate. For example, cabling between the elements of FIG. 1 may include both wiring for the network 104 and distinct wiring for the dedicated timing network 106. The respective wirings can be electrically isolated from one another such that signals traversing the network 104 do not inhibit signals traversing the dedicated timing network 106. The depicted timekeepers 112 and dedicated timing networks 106 can be used to provide timing synchronization signals for the host computing devices to operate with the same notion in time.

Illustratively, each of the network 106A and 106B may carry exclusively a fixed signal, such as a fixed-width pulse (e.g., a pulse-per-second, or PPS, signal or other signal of fixed width, including a fixed frequency signal) that is broadcast from a single reference timekeeper 112 to downstream devices. For example, the reference timekeeper 112 may generate a series of PPS signals and the dedicated timing network 106 may receive the series of PPS signals and re-generate the PPS signals down through each level of the dedicated timing network 106 to eventually received by the host computing devices. Advantageously, when the root nodes, leaf nodes and the host computing devices observe the arrival or the rising edge of the received PPS signals at the same time, time synchronization among nodes of the dedicated timing network 106A-106B and host computing devices 115A-115C can be achieved. On the other hand, if the re-generated PPS signals are not transmitted to downstream devices at the right instants, time synchronization among nodes of the dedicated timing network 106A-106B may be lost even if the "source" PPS signals from reference timekeeper 112 are accurate in time. As discussed above, oscillator clock cycle drift and time-varying network delay may prevent a node in the dedicated timing network 106 to transmit re-generated PPS signals to downstream node(s) at the right timing. More specifically, clock cycle drifts may prevent a node from counting the right cycles for scheduling downstream PPS signals, which results in the node and a downstream node observe the arrival of PPS signals at different time instants. Thus, embodiments of the present disclosure may utilize a signal processor to enable a node of the dedicated timing network 106 to schedule PPS signals to downstream nodes so that downstream nodes and upstream nodes in the dedicated timing network 106 observe the rising edge or arrival of PPS signals synchronously. Specifically, a node may store time stamps that record the time instant of each PPS signals received from one or more upstream nodes. The node may apply signal processing techniques (e.g., filtering out unwanted time stamps and linear regression) to an appropriate number (which may be dependent on hardware specification of a local oscillator) of time stamps to pick up time stamps based on which clock period of a local oscillator can be estimated. Based on the estimated clock period, the node can more accurately count the right time instant at which a next PPS signal should be transmitted to downstream nodes.

In addition to connection to dedicated timing networks 106, reference timekeepers 112 may additionally connect to the general-purpose communication network 104. Illustratively, connection to the network 104 may facilitate collection of metadata regarding operation of the reference timekeepers 112, as discussed below. Moreover, in some embodiments the network 104 is utilized to provide a reference time from reference timekeepers 112 to host computing devices 115, which reference time indicates the present time. For example, where the dedicated timing network 106 indicates the occurrence of a second marker or the arrival of a PPS signal, but not which second has occurred, host computing devices 115 may require a reference point to determine which second has occurred. This reference point need not share the same accuracy as timing information provided by the dedicated timing network 106, as a reference time may be offset by plus or minus half the period of the timing information. For example, if the reference time is early by four tenths of a second, a host computing device 115 may receive the reference time and adjust the reference time to the nearest second marker or the nearest PPS signal as indicated by the timing information of the dedicated timing network 106, thus achieving time synchronization to the accuracy of the timing information. In one embodiment, a reference time is transmitted over the network 104 according to a known timing protocol, such as NTP. While such protocols may not be sufficiently accurate to independently synchronize time, they may be sufficiently accurate to provide a reference time in accordance with embodiments of the present disclosure.

Figure 2:
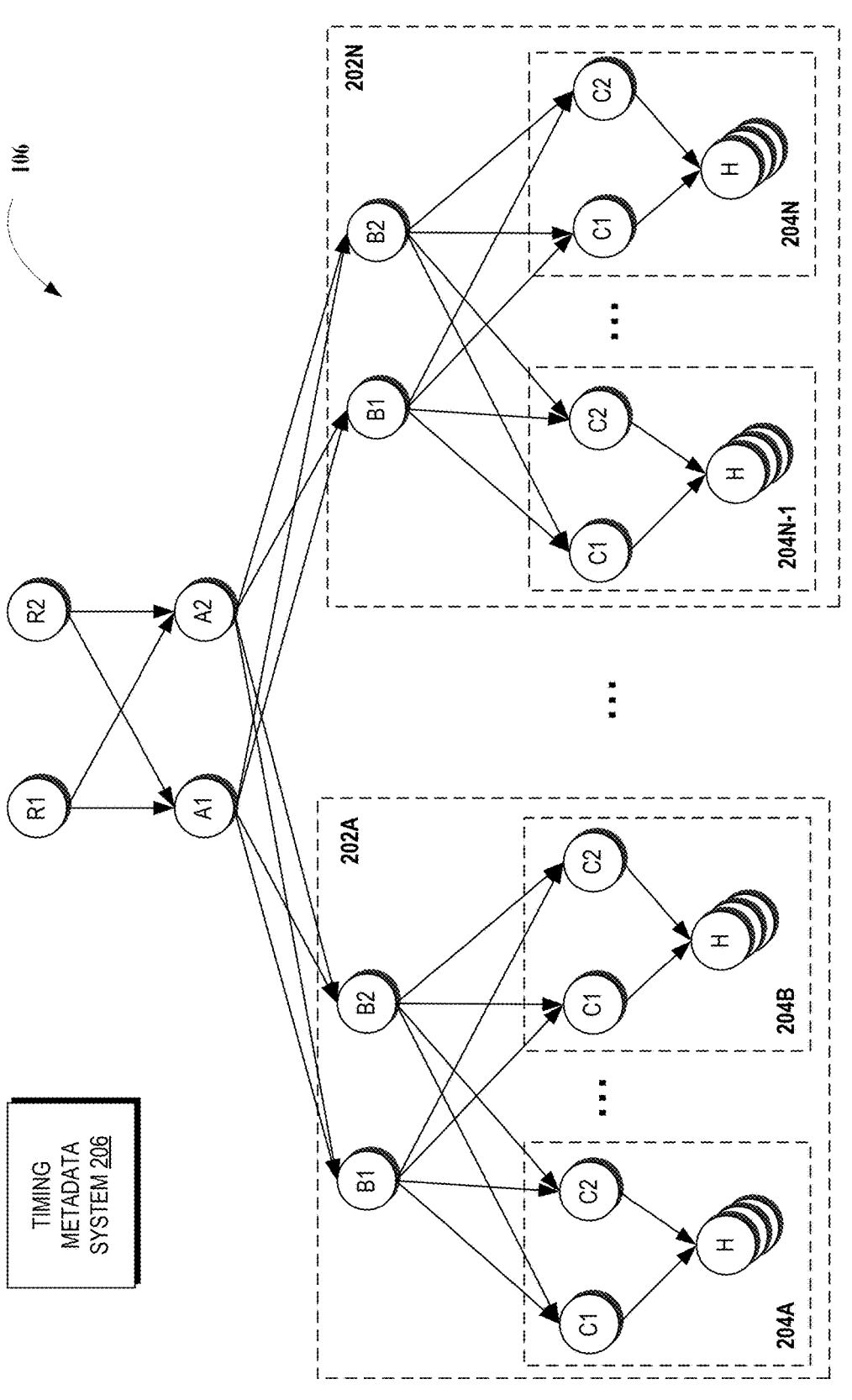
FIG. 2 depicts an example topology of a dedicated timing network in which embodiments of the present disclosure can be implemented to synchronize timing among nodes (including host computing devices) of the dedicated timing network.

FIG. 2 depicts an example topology of a dedicated timing network 106 in which embodiments of the present disclosure can be implemented to synchronize timing among nodes (including host computing devices 204A-204N) of a dedicated timing network. The illustrated topology may represent the configuration of a single dedicated timing network 106 within a data center within the cloud provider network 120 of FIG. 1. The topology is shown in FIG. 2 as a directed acyclic graph (DAG), with information flowing from reference timekeepers 112, shown in FIG. 2 as nodes R1 and R2, through the network 106 and to host computing devices 115, shown in FIG. 2 as nodes H. The dedicated timing network 106 thus includes network devices, such as switches, that connect nodes R1 and R2 to nodes H. Illustratively, the dedicated timing network 106 includes at least two duplicated nodes at each level for redundancy and resiliency. For example, a second level of the dedicated timing network 106 includes nodes A1 and A2, which in turn communicate with a third level of the dedicated timing network 106 designated as nodes B1 and B2. At the third level (which may be referred to as a "distribution" level), nodes are logically grouped into sets 202, each including a node B1 and B2. FIG. 2 shows two such sets 202, set 202A and 202N. However, the dedicated timing network 106 may include any number of sets. Similarly, at the fourth level (which may be referred to as an "aggregation" level), nodes are logically grouped into level 4 sets 204, denoted in FIG. 2 as level 4 sets 204A-N. Each level 4 set 204 includes two network nodes C1 and C2 that provide timing information from the dedicated timing network 106 to a logical grouping of host computing devices 115, shown as nodes H. This logical grouping may represent, for example, a physical rack of such devices. Illustratively, a rack may include a "top of rack" switch that is configured to obtain timing information from nodes C1 and C2, and to select timing information from one of these nodes to pass onto host computing devices 115 within the rack. Each level three set 202 can include any number of level 4 sets 204. Accordingly, the dedicated timing network 106 enables the two reference timekeepers 112 represented by nodes R1 and R2 to be shared among a large number of host computing devices 115. More specifically, the PPS signals from the reference timekeepers 112 (i.e., nodes R1 and R2) can be re-generated at each level and passed down through level 1 nodes to level 4 nodes to achieve time synchronization among the host computing devices 115 (i.e., nodes H).

As noted above, each layer of the dedicated timing network 106 may include redundant devices. While FIG. 2 shows two redundant devices, three or more devices are possible. This redundancy can ensure continued operation of the network 106 even if cases of failure of a device. Further, the redundancy allows a node to receive more than one PPS signals (e.g., a pair of PPS signals) from upstream node(s), which can be useful in filtering out undesired PPS signals when estimating clock period drift as discussed above. While total failure is possible, one problematic situation in the context of timing information is a partial failure of a device, whereby the device fails to provide timing information with a desired accuracy. For example, an issue with a device or with an interconnect between devices may cause a signal to be delayed. Another source of delay can come from network congestions or malfunctions of the physical network appliances. For general communication networks, such delays may be expected and tolerated. However, for timing information, such delays can significantly impact synchronization. Accordingly, embodiments of the present disclosure may include within the dedicated timing network 106 a timing metadata system 206 configured to analyze metadata regarding operation of devices (e.g., nodes in the dedicated timing network 106) to detect or estimate delays between nodes, and in some cases to attribute such delays to particular nodes or edges within the dedicated timing network 106. For example, the timing metadata system 206 may provide the estimated delays to the nodes, which can in turn use the estimated delays to schedule PPS signals to be transmitted to downstream nodes as described above.

In some embodiments, the timing metadata system 206 may obtain metadata from each device in the dedicated timing network 106 (e.g., each node, including switches and host computing devices 115) regarding timing information received over the network 106. In one embodiment, this metadata reflects jitter in a signal transmitted over the dedicated timing network 106, as measured relative to an internal clock (e.g., a crystal oscillator) of the measuring device. For example, each reference timekeeper 112 may be configured to provide a PPS signal, with an edge aligned to each second. A receiving device (e.g., node A1) may determine the duration between second-aligned edges to determine, e.g., that more or less than a second has elapsed according to its internal clock. Jitter represents the variation in this period, and in general more jitter indicates a higher inaccuracy with respect to timing information. However, because jitter compares an internal clock to a network signal, it may not be possible to determine the source of such inaccuracy—that is, jitter may occur due to variance in a device's internal clock, variance in the network signal, or both.

By collecting metadata from multiple points within the network, the timing metadata system 206 may at least partially disambiguate inaccuracies to determine their source. For example, in the dedicated timing network 106, both nodes B1 and B2 receive a signal from node A1. An increase in jitter (with respect to the signal from A1) at both nodes B1 and B2 can indicate an issue with operation of A1. An increase in jitter (with respect to the signal from A1) at B1 without a corresponding increase in jitter at B2 can indicate an issue with respect to node B1 or the connection between B1 and A1, rather than with respect to A1 itself. Similarly, B1 is connected to both A1 and A2. If the jitter at B2 increases with respect to the signal of A1 but not with respect to the signal of A2, this can indicate an issue with the connection between B1 and A1 (or, alternatively an issue with A1, which may be ruled out using the logic above). Alternatively, if the jitter at B2 increases with respect to signals of both A1 and A2, this can indicate an issue with B2 (or, alternatively an issue with both A1 and A2, which may be ruled out using the logic above). Accordingly, the timing metadata system 206 may make pairwise comparisons of timing metadata between various nodes at a given level of the dedicated timing network 106 to identify particular nodes or edges that are experiencing low-accuracy operation. In conjunction with the above discussion regarding filtering out undesired PPS signals from being used to estimate clock period drift, the timing information gathered by the timing metadata system 206 can be useful. Specifically, if the timing information received from the timing metadata system 206 shows that there are some issues with the connection between node A1 and node B1, node B1 can exclude the PPS signals received from node A1 and use only PPS signals received from node A2 to estimate oscillator clock period drift.

While jitter is provided as one example of metadata regarding low-accuracy operation of nodes within the dedicated timing network 106, other types of metadata are possible. For example, in the instance that a node within in the network fails, downstream nodes may continue to retransmit timing information further downstream to avoid cascading failure. Illustratively, if node A1 ceases to receive a signal from nodes R1 and R2, node A1 may nevertheless continue to transmit timing information downstream to each node B1 and B2, such as by generating a PPS signal based on an internal clock of node A1. Because such signal may be less accurate than a signal locked to a reference timekeeper device, the timing metadata system 206 may collected metadata indicating that a signal of a given node has been decoupled from an upstream node, and may notify downstream nodes that the node A1 is therefore operating with low accuracy. Additionally or alternatively, the node A1 may modify the signal generated by that node to indicate low accuracy, such as by modifying the signal transmitted downstream in a manner that indicates low accuracy information. As such, node B1 may also exclude PPS signals received from node A1 and use only PPS signals received from node A2 to estimate oscillator clock period drift. Advantageously, this may allow node B1 to more accurately estimate its clock period drift, which in turn would help node B1 to schedule the PPS signals to be transmitted to downstream node at better time instants for achieving synchronization among the nodes of the dedicated timing network 106.

Further, on detecting a node or edge experiencing low-accuracy operation, the timing metadata system 206 may notify relevant downstream nodes (e.g., those connected to the node or edge). These downstream nodes, in turn, may be configured to select an alternative upstream source of timing information. Thus, if node A1 for example is experiencing low-accuracy operation, each node B1 and B2 may be configured to pass on timing information from node A2, allowing the timing information from node A1 to be dropped. While not shown in FIG. 2, the timing metadata system 206 may be in network communication with each node. For example, each node and the timing metadata system 206 may communicate via the network 104 of FIG. 1. Illustratively, the timing metadata system 206 may be implemented as software executing within an instance 116 of FIG. 1.

As discussed above, still another source of inaccuracy in timing information is clock drift, whereby a crystal oscillator or other time source within a device operates at a varying frequency, leading to an internal clock of that device running at a variable rate. One known contributor to clock drift is temperature. However, the specific drift experienced by an oscillator at a given temperature may vary according to the particular oscillator in question. Manufacturers may specify such drift statistically, guaranteeing for example a drift within a certain range at a given temperature. Unfortunately, these statistical measures are typically not accurate enough to conduct calibration with respect to an individual oscillator. As such, when a node utilizes cycles of the oscillator to count time for scheduling PPS signals for downstream node(s), the scheduled time may be susceptible to clock period drift, resulting in nodes in the dedicated timing network 106 observe the arrival of PPS signals at different time instants.

Embodiments of the present disclosure can address at least some of the problems associated with synchronizing nodes of the dedicated timing network 106 by estimating the clock period drift and use the estimated clock period to compute a better timing to transmit PPS signals to downstream nodes. For example, node B1 may utilize PPS signals received from node A1 to account for clock period drift of node B1's local oscillator to schedule a next PPS signal for node C2. More specifically, for each of the PPS signals received from node A1, node B1 may generate a corresponding time stamp that record a counter value counted according to the cycles of the local oscillator. Node B1 may then select a set of time stamps for the purpose of estimating clock period drift. The set of time stamps may further be partitioned into several subsets of time stamps and node B1 may select desired time stamps from at least some of the subsets, and then estimate the clock period of the oscillator based on the desired time stamps. For example, the set of time stamps may include 1,000 time stamps, which correspond to 1,000 PPS signals received from upstream node(s). The 1,000 time stamps may be divided into four subsets (i.e., each subset has 250 time stamps). Node B1 may select the left-most subset (i.e., the first 250 time stamps of the 1,000 time stamps) and the right-most subset (i.e., the last 250 time stamps of the 1,000 time stamps). Each of the 250 time stamps in the left-most subset and the right-most subset may be represented as a point in a 2D plane, with x-axis showing the order of the time stamps and y-axis showing the counter value associated with the time stamp. For example, the $100^{th}$ point in the right-most subset may be represented as (100, $C_{100}$), where $C_{100}$ represents the counter value when the $100^{th}$ PPS signal among the 1,000 PPS signals selected; and the $150^{th}$ point in the left-most subset may be represented as (900, $C_{900}$), where $C_{900}$ represents the counter value when the $900^{th}$ PPS signal among the 1,000 PPS signals is received. For each of the left-most and right-most subsets, node B may generate a linear regression curve based on the time stamps in each of the subset. Node B may then select a desired time stamp that has a minimum distance to a projection point in the linear regression curve from each subset. Based on the two selected time stamps, the clock period of the oscillator can be estimated. Assuming the two selected time stamps correspond to the $100^{th}$ PPS signal and the $900^{th}$ PPS signal among the 1,000 PPS signals, the estimated clock period would equal the inverse of ($C_{900}$– $C_{100}$)/(900–100). Afterwards, node B may schedule the time instant a next PPS signal is to be transmitted downstream node(s) by counting one second minus network delay using the estimated clock period.

In other embodiments, the timing metadata system 206 may further be configured to estimate an accuracy of timing information for a given host computing device 115. For example, the timing metadata system 206 may obtain metadata regarding operation of each node and edge between a reference timekeeper 112 and a host computing device 115, and analyze the metadata to determine a current accuracy of each node and edge. Potentially inaccuracy bands may be summed among the path from the reference timekeeper 112 and the host computing device 115 to determine an effective accuracy band at the host computing device. For example, where two nodes divide the reference timekeeper 112 and the host computing device 115, with a first node having an accuracy of plus or minus 2 microseconds relative to the reference timekeeper 112 and a second node having an accuracy of plus or minus 3 microseconds relative to the first node, the expected accuracy of host computing device 115 relative to the reference timekeeper 112 may be 5 microseconds. Accordingly, an instance 116 may obtain information indicating the expected accuracy of the time information.

Figure 3:
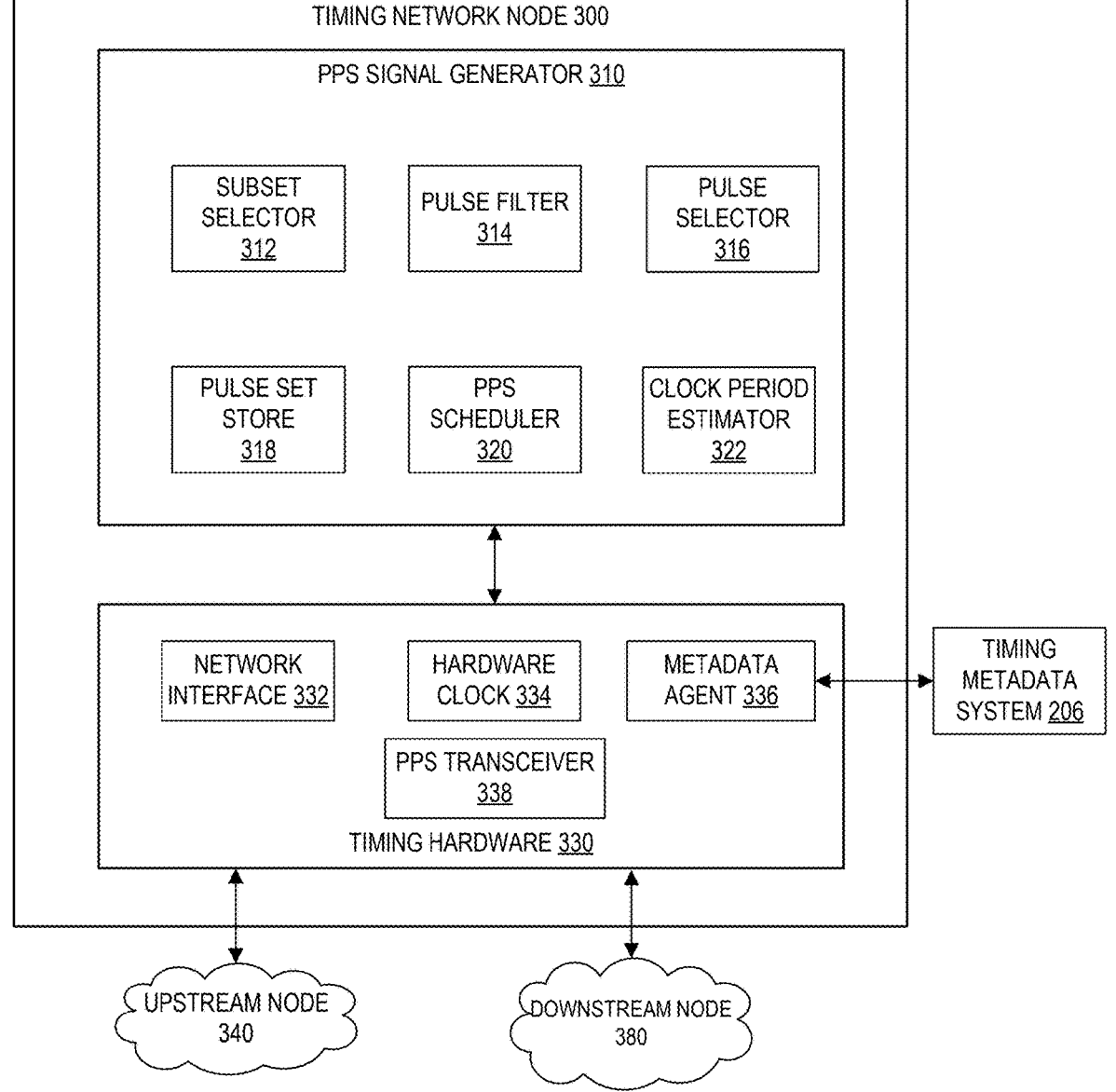
FIG. 3 depicts an example logical model of a node in the dedicated timing network of FIG. 1, where the node can be utilized to generate time synchronization signals to be transmitted to downstream nodes for achieving synchronization among nodes in the dedicated timing network.

FIG. 3 depicts an example logical model of a timing network node 300 that can be any of the nodes A1-A2, B1-B2 and C1-C2 in the dedicated timing network 106 of FIG. 2, where the timing network node 300 can be utilized to generate time synchronization signals to be transmitted to downstream nodes for achieving synchronization among nodes in the dedicated timing network 106. The timing network node 300 has a PPS signal generator 310 and a timing hardware 330. The timing hardware 330 can receive PPS signals from upstream node 340 and can provide a local oscillator clock for time tracking and/or time synchronization purposes. By estimating a drift of the local oscillator clock, the PPS signal generator 310 can schedule a next PPS signal such that the downstream node 380 obtains the next PPS signal simultaneously to the timing network node 300 receiving a new PPS signal from the upstream node 340.

As illustrated in FIG. 3, the timing hardware 330 includes a hardware clock 334, a network interface 332, a PPS transceiver 338, and a metadata agent 336. In some examples, the timing hardware 330 may be an isolated hardware deployed on an "offload" card, such as an expansion card (e.g., peripheral component interconnect express, or "PCIe", card) installed on the timing network node 300. Regarding the offload card, in some implementations, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor, or an operating system of the hypervisor), input/output virtualization to network-attached storage volumes, local migration management tasks, instance health monitoring, and the like. The offload card can function as a network interface card (NIC) of a host in some implementations, and can implement encapsulation protocols to route packets.

The network interface 332 may correspond to a physical network interface that can facilitate network signal transmission between the timing network node 300 and the upstream node 340 and the downstream node 380, such as by providing network connectivity capability to the timing network node 300. The metadata agent 336 may be implemented by software to be capable of processing and interpreting timing metadata received from the timing metadata system 206 that is described with respect to FIG. 2. Additionally, the metadata agent 336 can generate metadata regarding operation of the timing network node 300 to be transmitted to the timing metadata system 206 through the network interface 332 for further analysis by the timing metadata system 206 to determine a network condition associated with the dedicated timing network 106.

The PPS transceiver 338 can serve as an interface that receives PPS signals from the upstream node 340 and transmits PPS signal scheduled by the PPS signal generator 310 to the downstream node 380. The PPS transceiver 338 may include hardware that can detect a rising edge (or a falling edge or other signal waveform characteristics that indicate the arrival of a PPS signal) of PPS signals received from the upstream node 340 such that the time instants PPS signals are received can be recorded, for example, by the PPS signal generator 310. Additionally, the PPS transceiver 338 can include hardware that is capable of generating physical pulse signals in accordance with the specification of the PPS signals defined by the dedicated timing network 106 at the moments scheduled by the PPS signal generator 310. In some examples, the PPS transceiver 338 can be integrated with the network interface 332 as different parts of the same hardware.

The hardware clock 334 can be a clock generated by a crystal oscillator that is intended for the timing network node 300 to keep track of time and/or maintain time synchronization with other nodes in the dedicated timing network 106. The oscillator may have a nominal operating frequency (e.g., 250 MHz) but, as discussed above, the clock period of the oscillator may drift because of variations of temperature, supply voltage or the like. The hardware clock 334 may further provide for a clock counter that counts once whenever the oscillator clock completes one cycle. The values of the clock counter can be stored, for example, by the PPS signal generator 310 for estimating clock period drift of the hardware clock 334 based on the clock counter values at time instants PPS signals are received by the PPS transceiver 338 from the upstream node 340.

In FIG. 3, the PPS signal generator 310 includes a pulse set store 318, a subset selector 312, a pulse filter 314, a pulse selector 316, a clock period estimator 322, and a PPS scheduler 320. The PPS signal generator 310 illustratively represents a set of signal processing modules that may include a combination of data processing and memory storage resources for deriving the timings for scheduling PPS signals to be transmitted to the downstream node 380. Specifically, through the signal processing operations performed by the PPS signal generator 310 based on the hardware clock 334 and the PPS signals received by the PPS transceiver 338 from the upstream node 340, the timing network node 300 can calculate the instant send out a downstream PPS signal so that the downstream node 380 obtains the downstream PPS signal at the same time the timing network node 300 receives an upstream PPS signal from the upstream node 340.

The pulse set store 318 can be implemented by any suitable memory medium (e.g., RAM, cache or hardware registers) that is capable of storing clock counter values that can be provided by the hardware clock 334, where each clock counter value represents the time instant an upstream PPS signal is received from the upstream node 340 by the timing network node 300. As such, the clock counter values stored in the pulse set store 318 may form a plurality of time stamps, where each time stamp records the time instant an upstream PPS signal is received from the upstream node 340. Theoretically, assuming the hardware clock has a nominal frequency of 250 MHz and there is no network noise/jitter, two consecutive time stamps would differ by 250,000,000 because two consecutive PPS signals from the upstream node 340 would be received by one second apart. As discussed above, because of the presence of hardware clock drift and/or network noise, the differences between any two consecutive time stamps would deviate from 250,000,000. In some examples, the pulse set store 318 may store all time instants upstream PPS signals are received as long as the storage capacity of the pulse set store 318 permits. Alternatively, the pulse set store 318 may store only some of the time stamps. For example, the pulse set store 318 may store N time stamps, where N can be 1000, 2000, 3000 or any other suitable values. As indicated above, the value of N may be determined to be within a range in which the oscillator drift dominates the network noise and can be approximated linearly. In some examples, N may be derived based on Allan deviation. Specifically, the value of N may be chosen based on an inflection point in the Allan deviation plot.

The subset selector 312, the pulse filter 314, the pulse selector 316, the clock period estimator 322, and the PPS scheduler may be implemented by dedicated hardware logics (e.g., ASIC), a digital signal processor (DSP), and/or a general purpose processor. The subset selector 312 can select a portion of the time stamps stored in the pulse set store 318 for estimating drift of the hardware clock 334. In some examples, the subset selector may divide the N time stamps stored in the pulse set store 318 into three, four, five or other suitable number of subsets, and select some or all of the subsets for further processing. For example, the subset selector 312 may divide N time stamps into four subsets such that each subset has N/4 time stamps. Then, the subset selector 312 may select some or all (e.g., two) of the four subsets for estimating drift of the hardware clock 334. Optionally, the time stamps of a selected subset can be sent to the pulse filter 314, where outlier (e.g., unwanted) time stamps can be removed from further processing. The pulse filter 314 may identify outlier time stamps based on different criterion discussed above, such as the difference of arrival time of a pair of PPS signals from two upstream nodes and/or the hardware specification (e.g., maximum frequency deviation) of the hardware clock 334.

Based on the time stamps within a subset that are not filtered out by the pulse filter 314, the pulse selector 316 can select one or more desired time stamps for estimating drift of the hardware clock 334. In some examples, the selection performed by the pulse selector 316 can be a two-step process. In the first step, the pulse selector 316 generates a curve that fits or approximates the time stamps within the subset. In some embodiments, as discussed above, the curve may be a linear curve that is generated by performing linear regression on time stamps within a subset. In the second step, the pulse selector 316 can select a time stamp based on a distance between the time stamp and a corresponding projecting point in the curve. For example, the time stamp selected by the pulse selector 316 may be the time stamp that has the minimum distance to its projection on a linear regression curve among all the time stamps within the subset. In some examples, the pulse selector 316 can select two subsets of time stamps (e.g., the left-most subset and right-most subset of the N time stamps stored in the pulse set store 318) for performing linear regression analysis and then select one time stamp from each of the two subsets that will be sent to the clock period estimator 322 for estimating period of the hardware clock 334.

Based on the time stamps selected by the pulse selector 316, the clock period estimator 322 can calculate an estimated clock period of the hardware clock 334, where the estimated clock period can be used by the PPS scheduler 320 to determine the time instant a next PPS signal is to be transmitted to the downstream node 380. In some embodiments, the estimated clock period can be calculated based on the difference of the selected time stamps and the order of the selected time stamps. More specifically, assuming 1,000 time stamps are stored in the pulse set store 318, the subset selector divides the 1,000 time stamps into four subsets and selects the first 250 time stamps and last 250 time stamps that are sent to the pulse selector 316, and the pulse selector 316 selects the $50^{th}$ time stamp and the $950^{th}$ time stamp, then the clock period estimator 322 can calculate the estimated clock period of the hardware clock 334 by deriving the inverse of $(TS_{950}-TS_{50})/(950-50)$, where $TS_{950}$ is the value of the $950^{th}$ time stamp and $TS_{50}$ is the value of the $50^{th}$ time stamp. Based on the estimated clock period of the hardware clock 334, the PPS scheduler 320 can schedule a time instant for transmitting a next PPS signal to the downstream node 380 such that the downstream node 380 obtains the next PPS signal simultaneously to the timing network node 300 receiving a new PPS signal from the upstream node 340. As discussed above, the PPS scheduler 320 may schedule the time instant based on the time the latest upstream PPS signal is received from the upstream node, the network delay between the timing network node 300 and the downstream node 380 and the estimated clock period of the hardware clock 334. Then, the PPS scheduler 320 may trigger the PPS transceiver 338 to transmit the next PPS signal to downstream node 380 at the scheduled time the PPS scheduler 320 derived.

Figure 4A:
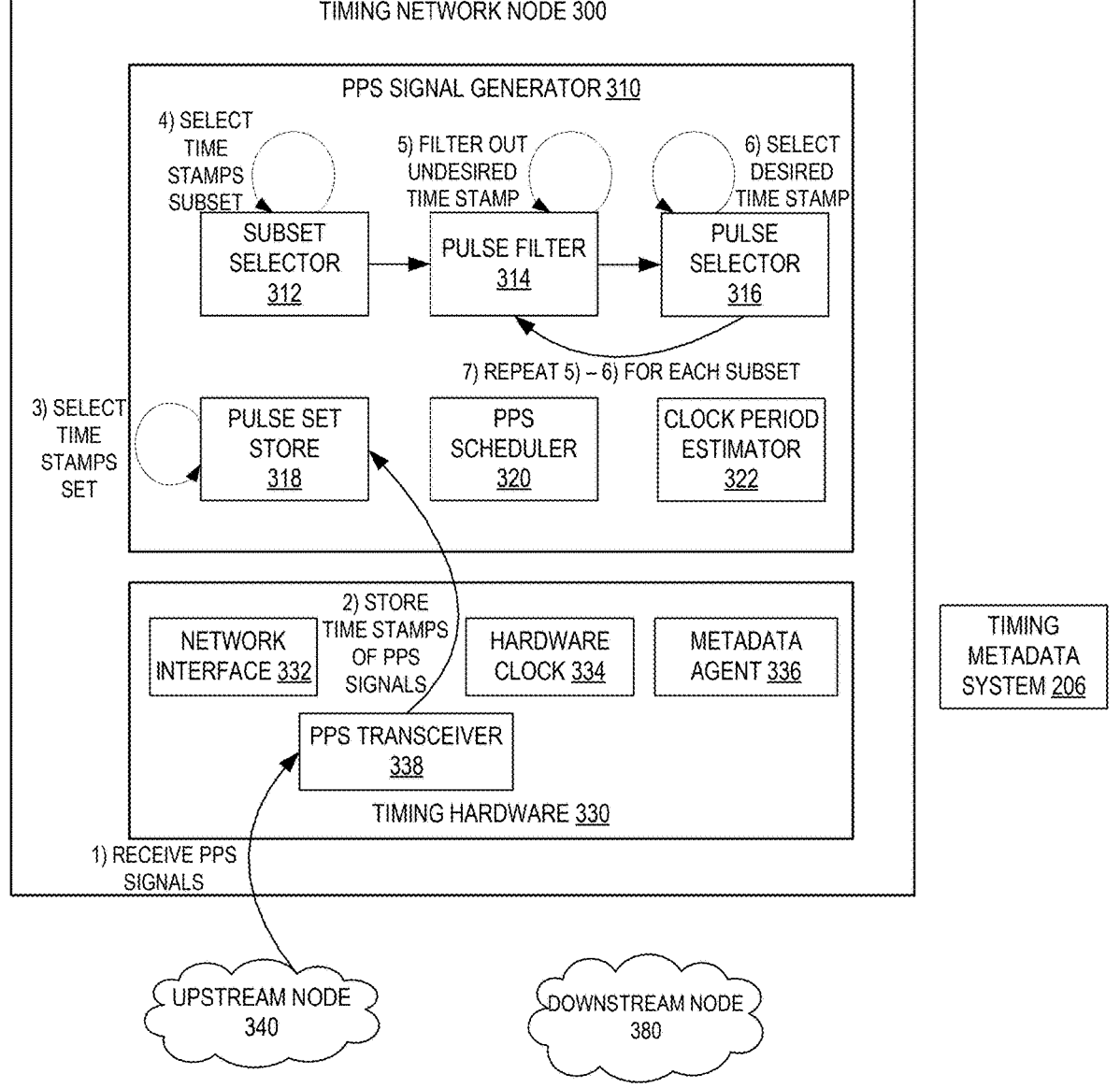
FIGS. 4A-4B depict example interactions for generating a next downstream PPS signal to achieve synchronization among nodes of the dedicated timing network in FIG. 2.
Figure 4B:
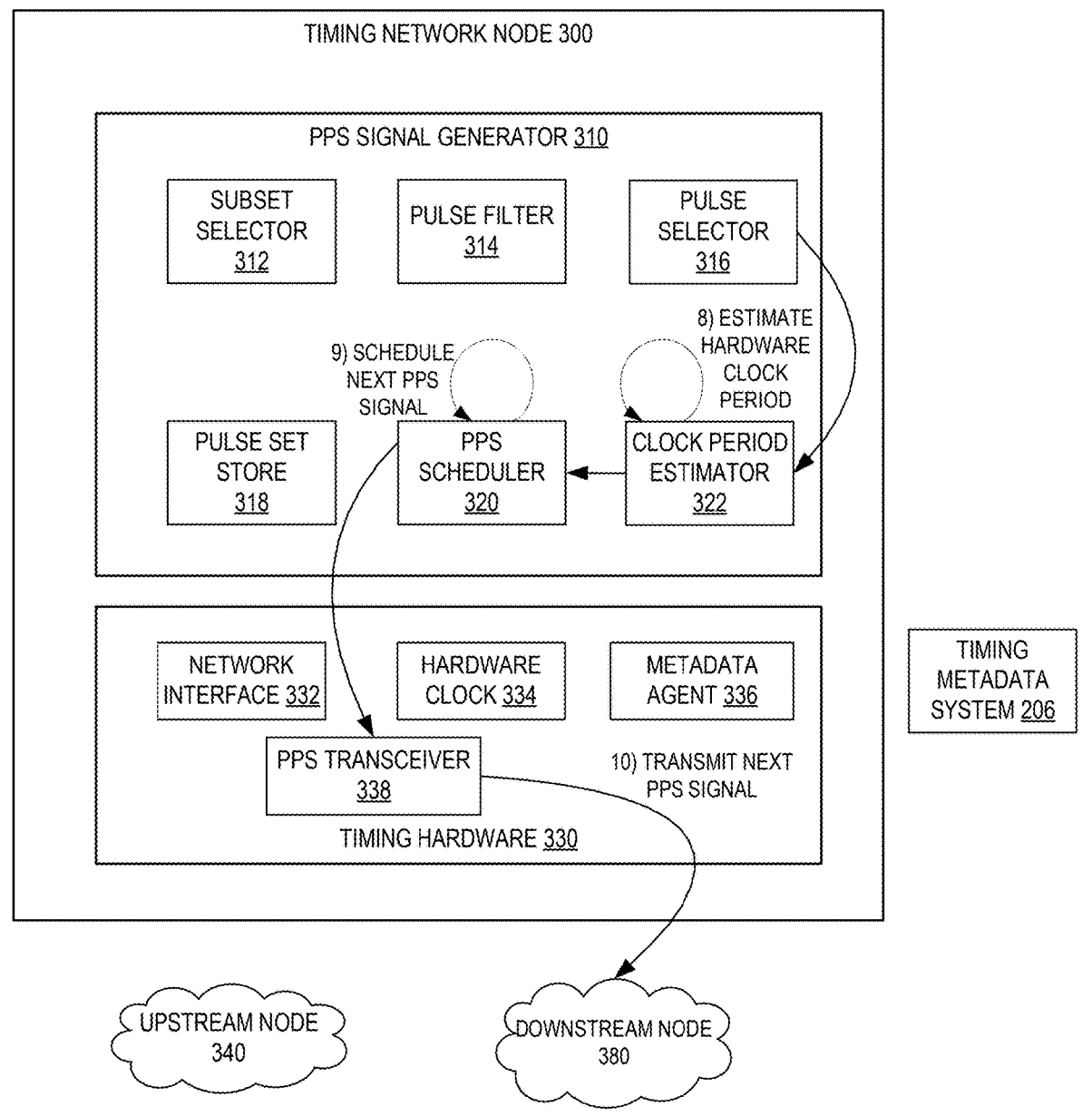

With reference to FIGS. 4A-B, illustrative interactions will be described depicting how elements of the timing network node 300 of FIG. 3 (e.g., the PPS transceiver 338 and components within the PPS signal generator 310) can provide for estimating clock period of a local oscillator (e.g., hardware clock 334) under the presence of oscillator period drift and utilizing the estimated clock period to schedule a downstream PPS signal such that the timing network node 300 and the downstream node 380 receive PPS signals simultaneously. Specifically, FIGS. 4A-4B depicts illustrative interactions on a node of the dedicated timing network 106 of FIG. 1 to schedule a time instant at which a next PPS signal is to be sent to one or more downstream nodes based on estimated period of a local oscillator, which estimation is based on timings of PPS signals received from one or more upstream nodes.

The interactions of FIG. 4A begin at (1), where PPS signals are received by a local node (i.e., the timing network node 300) from an upstream node 340. Specifically, the PPS transceiver 338 may receive PPS signals from the upstream node 340. In some embodiments, the PPS signals received by the PPS transceiver 338 may come from two or more upstream nodes. In some embodiments, the signals received from the upstream node 340 may be fixed-width timing signals or any other timing signals agreed among the nodes of the dedicated timing network 106 that can be utilized for synchronizing timing among the timing network node 300, the upstream node 340 and the downstream node 380. Due to the presence of noise/jitter in the dedicated timing network 106, the PPS signals received by the PPS transceiver 338 from the upstream node 340 may not be received exactly one second apart from each other.

Accordingly, at (2), the pulse set store 318 records the time instants at which some or all of the PPS signals from the upstream node 340 are received. The time instants recorded by the pulse set store 318 may be values of a clock counter, where the clock counter counts once whenever the local oscillator clock (i.e., hardware clock 334) completes one cycle. The clock counter values can be provided by the hardware clock 334 or pulse set store 318. Specifically, when a PPS signal from the upstream node 340 is received by the PPS transceiver 338, the pulse set store 318 may record the value of the clock counter at the moment the PPS signal is received. As such, the time instants at which some or all of the PPS signals are received from the upstream node are recorded by the pulse set store 318 using the hardware clock 334 as a reference, where each time instant corresponds to a clock cycle count of the hardware clock 334. Each of the time instants may be stored by the pulse set store 318 as a time stamp, recording when a corresponding PPS signal is received from the upstream node 340.

At (3), the pulse set store 318 selects certain number of time stamps stored for subsequent statistical analysis for estimating clock period drift of the hardware clock 334. The pulse set store 318 may select N (N being a positive integer) time stamps for further analysis, where N may be chosen based at least on a hardware specification (e.g., amount of frequency deviation) of the hardware clock 334. For example, N may be less when frequency deviation is +/−45 ppm compared with when frequency deviation is +/−60 ppm. In some examples, network jitter sets a lower limit for selecting N, where N has to be selected to be large enough so that network jitter will not dominate clock drift when estimating clock period. Additionally, amount of frequency deviation may set an upper limit for selecting N, where N has to be chosen to be small enough such that the oscillator drift can still be tracked. In some embodiments, N is selected to be 1,000, 2,000 or 3,000. In some embodiments, N is selected based on an inflection point in the Allan deviation plot. Optionally, after determining the number of time stamps for further analysis, the pulse set store 318 may discard non-selected time stamps to free up some memory storage space.

Based on the selected set of time stamps, at (4), the subset selector 312 selects one or more subsets within the set of time stamps for estimating clock period of the hardware clock 334. For instance, the pulse set store 318 may select and identify 1,000 time stamps, based on which the subset selector 312 may group the 1,000 time stamps into four subsets of time stamps where each subset has 250 time stamps. More specifically, the first subset may include $1^{st}$ to $250^{th}$ time stamps, the second subset may include $251^{th}$ to $500^{th}$ time stamps, the third subset may include $501^{th}$ to $750^{th}$ time stamps, and the fourth subset may include $751^{th}$ to $1000^{th}$ time stamps. In some examples, at least two of the subsets may be selected for estimating the clock period of the hardware clock 334. For example, the subset selector 312 may select the first subset (i.e., $1^{st}$ to $250^{th}$ time stamps) and the fourth subset ($751^{th}$ to $1000^{th}$) for the pulse filter 314 and/or pulse selector 316 to process. In some embodiments, the subset selector 312 may group or divide the set of time stamps selected by the pulse set store 318 into more or less subsets. By letting each subset having 250 (or other appropriate number that might be more or less than 250) time stamps, the subset selector 312 can ensure there are sufficient number of time stamps available for analysis in each subset and the pulse selector 316 will be less likely to be forced to select an "outlier" time stamp (e.g., a time stamp received much earlier or later than it should have been because of network jitter/noise). By selecting some of the subsets (e.g., the first and fourth subsets) for further processing, the subset selector 312 can ensure that the time stamps eventually selected by the pulse selector 316 may have reasonable distance such that effect of clock drift can be properly estimated.

At (5), the pulse filter 314 processes a subset selected by the subset selector 312. Specifically, for a selected subset, the pulse filter 314 may filter out or remove time stamps that should not be used for estimating clock period drift. The pulse filter 314 may remove "undesired" time stamps based on different criterion. For example, the pulse filter 314 may remove a time stamp if the arrival time instants of a corresponding pair of PPS signals received from two upstream nodes differ by more than certain threshold, which threshold may be determined based on the timing requirements associated with the dedicated timing network 106. As described above, if the dedicated timing network 106 requires the PPS signals broadcasted to nodes can be reached within 100 nanosecond of a GNSS source and the dedicated timing network 106 has a network depth of four levels, the pulse filter 314 may determine that the arrival time of a pair of PPS signals from two upstream nodes should not differ by more than 25 nanoseconds, which equals six clock cycles if the hardware clock 334 has a nominal frequency of 250 MHz (i.e., a nominal clock period of 4 ns). As such, the pulse filter 314 may remove a time stamp if that time stamp corresponds to a pair of PPS signals that arrived at the timing network node 300 apart from six clock cycles of the hardware clock 334. The pulse filter 314 may also remove a time stamp based on the hardware specification of the hardware clock 334. For instance, as illustrated above, if the hardware specification provided that the hardware clock has a nominal frequency of 250 MHz and a frequency deviation up to +/−45 ppm, the pulse filter 314 may remove two consecutive time stamps if the arrival times of their corresponding PPS signals received from the upstream node 340 is more than 1.000090 second or less than 0.999910 second. As such, after the processing by the pulse filter 314, there may be fewer time stamps within a subset selected by the subset selector 312 that will be processed by the pulse selector 316.

Accordingly, at (6), the pulse selector 316 selects a time stamp that is not removed by the pulse filter 314 from a selected subset for estimating clock period of the hardware clock 334. Due to clock drift and network noise/jitter, time stamps in a selected subset represented on a 2D plane (e.g., x-axis represents the order a particular time stamp is received and the y-axis represents the corresponding clock counter value) may not form a straight line having a constant slope. The pulse selector 316 may perform statistical analysis to find a curve that approximates the time stamps within the selected subset. As discussed above, in some examples, the pulse selector 316 conducts linear regression analysis on the time stamps to derive a linear curve on the 2D plane that fits/approximates the time stamps. The pulse selector 316 may then select a time stamp within the selected subset that is closest to its corresponding projection point on the linear curve for estimating clock period of the hardware clock 334.

At (7), interactions (5) and (6) performed on a subset selected by the subset selector 312 are repeated on other subsets until all of the subsets selected by the subset selector 312 are processed by the pulse filter 314 and pulse selector 316. For example, assuming the pulse set store selects 1,000 time stamps, which are grouped into four subsets by the subset selector 312 with the first and fourth subsets selected by the subset selector 312 for estimating the clock period of hardware clock 334, then (5) and (6) can be performed twice. In the first iteration, the first subset selected by the subset selector 312 is processed by the pulse filter 314 and pulse selector 316. In the second iteration, the fourth subset are processed similarly. As such, one time stamp in the first subset may be selected by the pulse selector 316, and one time stamp in the fourth subset may be selected by the pulse selector 316.

The interactions of FIG. 4A are continued with reference to FIG. 4B, where at (8) the clock period estimator 322 estimates the period of the hardware clock 334 based on the time stamps selected by the pulse selector 316. Assuming 1,000 time stamps selected by pulse set store 318, divided into four subsets by subset selector 312, with the first and fourth subsets selected for processing by pulse filter 314 and pulse selector 316, and 900$^{th}$ and 100$^{th}$ time stamps selected by the pulse selector 316, then the clock period estimator 322 may estimate the period of the hardware clock 334 by calculating the inverse of $(C_{900}-C_{100})/(900-100)$, where $C_{900}$ represents the 900$^{th}$ time stamp stored in the pulse set store 318 and $C_{100}$ represents the 100$^{th}$ time stamp stored in the pulse set store 318. As such, an estimated period that reflects the actual period of the hardware clock 334 is derived, which may then enable the timing network node 300 to schedule a next PPS signal to be sent to the downstream node 380 at the right time instant.

At (9), the PPS scheduler 320 schedules the next PPS signal to be sent to the downstream node 380 based on the estimated period of the hardware clock 334. Assuming the value of the clock counter that counts once whenever the hardware clock 334 completes one cycle is $C_{rev}$ when the latest PPS signal is received from the upstream node 340, then the PPS scheduler 320 may schedule the next PPS signal at the time instant when the value of the clock counter equals $C_{rcv}+1/(p(t))$, where p (t) represents the estimated period of the hardware clock 334 and $1/(p(t))$ represents the number of an estimated clock cycle that make up one second. In some examples, the PPS scheduler 320 may further take network delay (e.g., the time it takes for a PPS signal to be transmitted from the timing network node 300 to the downstream node 380) into consideration when scheduling the next downstream PPS signal. For example, assuming the network delay is d second, the PPS scheduler 320 may schedule the next PPS signal to be sent to the downstream node 380 when the value of the clock counter equals $C_{rev}+1/(p(t))-d/(p(t))$. In other words, the PPS scheduler 320 may schedule the next PPS signal to be sent earlier compared with when there is no network delay between the timing network node 300 and the downstream node 380.

At (10), the PPS transceiver 338 transmits the next PPS signal to the downstream node 380 at the time instant provided by the PPS scheduler 320. Continuing the example with network delay in (9), by transmitting the next PPS signal at the time instant when the value of the clock counter equals $C_{rev}+1/(p(t))-d/(p(t))$, the downstream node 380 would receive the next PPS signal when the value of the clock counter equals $C_{rev}+1/(p(t))$ due to the presence of d second of network delay. In addition, the timing network node 300 will also receive the next upstream PPS signal from the upstream node 340 at the time instant when the value of the clock counter equals $C_{rev}+1/(p(t))$ because two consecutive PPS signals should be received by the timing network node 300 by one second apart. As such, by estimating the clock period of the hardware clock 334, the timing network node 300 and the downstream node 380 may receive PPS signals simultaneously such that the two nodes may have the same notion of time.

Figure 4C:
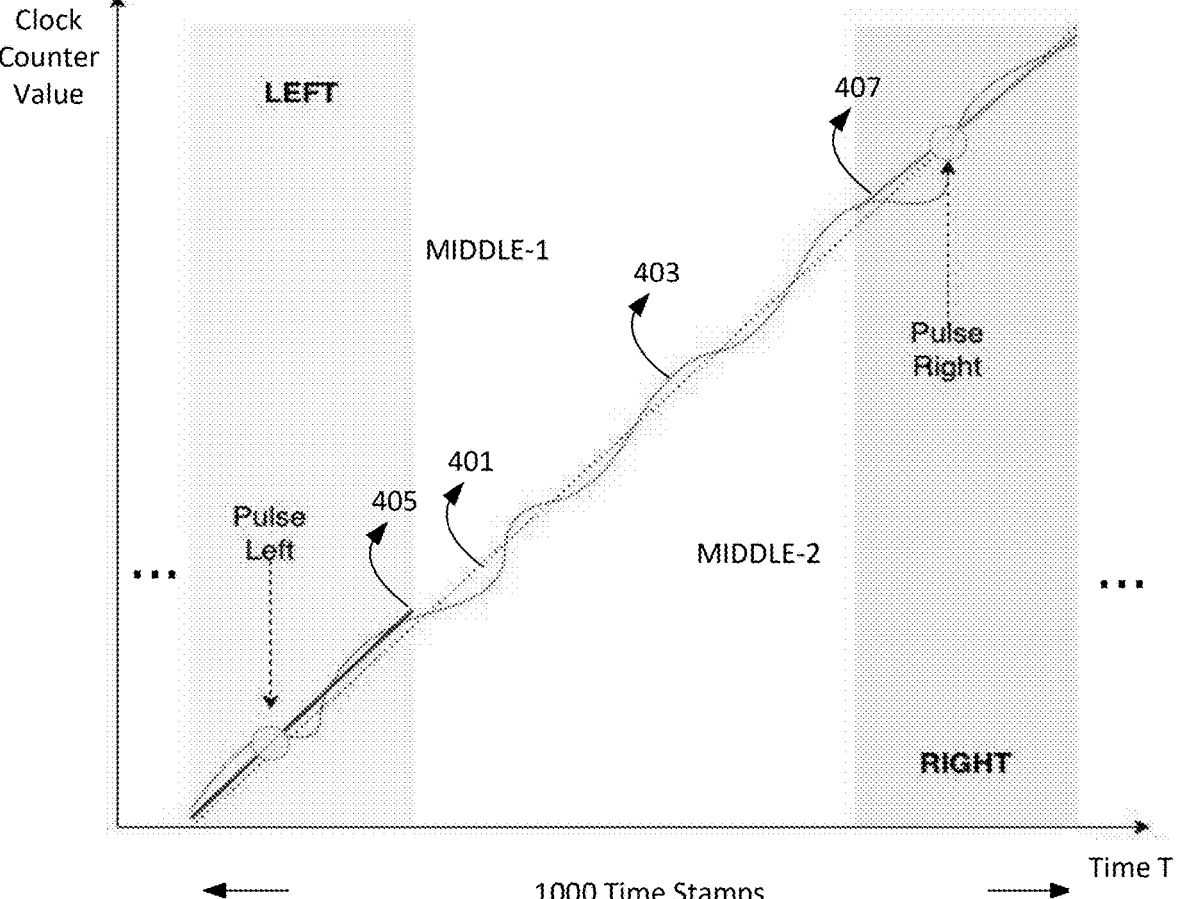
FIG. 4C shows an example set of time synchronization signals selected by the node of FIG. 3 for illustrating interactions depicted in FIGS. 4A-4B in accordance with embodiments of the present disclosure.

FIG. 4C illustrates an example set of time stamps selected by the timing network node 300 for estimating clock period of the hardware clock 334. With reference to FIGS. 4A-4C, a specific example illustrating the interactions (3)-(9) depicted in FIGS. 4A-4B is described. As shown in FIG. 4C, the x-axis represents the order/sequence in time each time stamp is generated and the y-axis represents the value of each time stamp (i.e., the clock counter value at the moment when a corresponding PPS signal is received). As described previously, at (2) of FIG. 4A, the pulse set store 318 records the time instants at which some or all of the PPS signals from the upstream node 340 are received, where each of the time instants represents the value of a clock counter that counts once whenever the hardware clock 334 completes one cycle.

As shown in FIG. 4C, at (3), the pulse set store 318 selects 1,000 time stamps (i.e., N equals 1,000) among the time stamps stored for estimating the clock drift of the hardware clock 334. Due to clock period drift, the clock counter values associated with the 1,000 time stamps do not form the dotted straight line 401 with a constant slope as shown in FIG. 4C. Instead, the clock counter values associated with the 1,000 time stamps form a curve 403 that deviates around the dotted straight line 401 in a random manner dictated by the clock period drift.

Thereafter, at (4), the subset selector 312 selects two subsets (subset LEFT and subset RIGHT) among the 1,000 time stamps for estimating the clock drift of the hardware clock 334. More specifically, the subset selector 312 groups the 1,000 time stamps into four subsets (LEFT, MIDDLE-1, MIDDLE-2, RIGHT) of time stamps, where each of the four subsets has 250 time stamps. The subset selector 312 then selects the first 250 time stamps (subset LEFT) and the last 250 time stamps (subset RIGHT) for estimating clock drift of the hardware clock 334. Although a subset having 250 time stamps is illustrated in FIG. 4C, in some embodiments, each of the selected subset may have more or fewer time stamps than 250.

Though not explicitly illustrated in FIG. 4C, at (5), the pulse filter 314 can optionally filter the subset LEFT to remove "outlier" time stamps within the subset LEFT. Then, at (6), the pulse selector 316 selects a time stamp (i.e., Pulse Left) from the subset LEFT for estimating the clock drift of the hardware clock 334. More specifically, the pulse selector 316 conducts linear regression analysis on the time stamps within the subset LEFT to derive a linear curve 405 that fits the time stamps within the subset LEFT. Though not easily observed from FIG. 4C, the pulse selector 316 then selects the time stamp "Pulse Left" because "Pulse Left" has the minimum distance to its projection point on the linear curve 405 compared with other time stamps in the subset LEFT.

At (7) of FIG. 4A, the above operations described at (5) and (6) are performed on the subset RIGHT to select the time stamp "Pulse Right" from the subset RIGHT for estimating clock drift of the hardware clock 334. Specifically, at (5), the pulse filter 314 can optionally filter the subset RIGHT to remove "outlier" time stamps within the subset RIGHT. Then, at (6), the pulse selector 316 selects a time stamp (i.e., Pulse Right) from the subset RIGHT for estimating the clock drift of the hardware clock 334. More specifically, the pulse selector 316 conducts linear regression analysis on the time stamps within the subset RIGHT to derive a linear curve 407 that fits the time stamps within the subset RIGHT. Though not easily observed from FIG. 4C, the pulse selector 316 then selects the time stamp "Pulse Right" because "Pulse Right" has the minimum distance to its projection point on the linear curve 407 compared with other time stamps in the subset Right. By using the subset RIGHT and subset LEFT for selecting two time stamps for estimating clock period of the hardware clock 334, a threshold distance between two selected time stamps can be obtained. Specifically, as illustrated in FIG. 4C, the two time stamps selected for estimating the clock period of the hardware clock 334 are apart from each other in order within the 1,000 time stamps beyond the threshold distance of 500 because at least the 500 time stamps of the subsets MIDDLE-1 AND MIDDLE-2 are in between the two time stamps (i.e., "Pulse Right" and "Pulse Left") selected.

Thereafter, at (8) and (9) of FIG. 4B, the clock period estimator 322 may derive clock period of the hardware clock 334 based on the "Pulse Right" and "Pulse Left" and the PPS scheduler 320 may schedule a next downstream PPS signal to the downstream node 380 based on the derived clock period in manners illustrated in the descriptions regarding FIG. 4B. For example, assuming "Pulse Right" is the $900^{th}$ time stamps among the 1,000 time stamps selected and "Pulse Left" is the $100^{th}$ time stamps among the 1,000 time stamps selected, then the clock period estimator 322 may estimate (at (8) of FIG. 4B) the period of the hardware clock 334 by calculating the inverse of $(C_{900}-C_{100})/(900-100)$, where $C_{900}$ represents the clock counter value of "Pulse Right" that is stored in the pulse set store 318 and $C_{100}$ represents the clock counter value of "Pulse Left" that is stored in the pulse set store 318. Then, at (9), the PPS scheduler 320 may schedule the next PPS signal to be sent to the downstream node 380 based on the estimated period of the hardware clock 334 as described previously at (9) of FIG. 4B.

In some embodiments, the number of time stamps (i.e., N, which is illustrated to be 1,000 in FIG. 4C) selected by the pulse set store 318 and/or the threshold distance between the time stamps (e.g., "Pulse Left" and "Pulse Right" as illustrated in FIG. 4C) selected by the pulse selector 316 for estimating clock period of the hardware clock 334 may be adjusted dynamically (rather than fixed) based on one or more factors discussed below. In some examples, N may be determined and adjusted based on factors such as temperature, age of hardware or length of operational time (e.g., operating time) associated with the timing network node 300 and the timing hardware 330. For example, as the timing hardware 330 is aging or when the timing hardware 330 has been running over a threshold amount of time, frequency deviation of the hardware clock 334 may increase. When the aging or run-time of the timing hardware 330 exceeds certain level (e.g., 10 years since manufactured or continuously running for over 1,000 hours), N may be decreased such that clock drift of the hardware clock 334 can still be well-approximated using statistical techniques (e.g., linear regression). In some examples, the timing network node 300 may dynamically adjust N when significant temperature variations associated with the timing hardware 330 is detected. For example, when the hardware clock 334 undergoes large variation of operating temperature, frequency deviation of the hardware clock 334 may increase. Upon detecting such variation of temperature associated with the hardware clock 334, the timing hardware 330 may decrease N such that N is small enough for a proper estimation of the clock period of the hardware clock 334.

In some embodiments, N can be adjusted and/or calibrated when certain event happens to the timing network node 300. Specifically, the timing network node 300 may adjust N after the timing network node 300 goes through a software update and/or a hardware update event. For example, after software update is performed on the timing network node 300, the timing network node 300 may operate under different software/hardware configurations which might affect the behavior of the hardware clock 334 or other components of the timing network node 300 that warrants the adjustment of N. As another example, when some of the hardware of the timing network node 300 is updated (e.g., the hardware clock 334 is replaced by a new hardware clock), the timing network node 300 may also adjust N based on the hardware specification of the new hardware clock. More specifically, if the maximum frequency deviation of the hardware clock 334 is 45 ppm and the maximum frequency deviation of the new hardware clock is 30 ppm, the timing network node 300 may decrease N (e.g., from 1,000 to 750) upon detecting that the hardware clock 334 is replaced by the new hardware clock.

In some embodiments, N can be adjusted based on network jitter/noise of the dedicated timing network 106 that the timing network node 300 resides. For example, when the network jitter increases, the timing network node 300 may increase N such that effect of network jitter may not outweigh effect of clock drift of the hardware clock 334. In some embodiments, N may be determined based on combinations of two or more factors described above. For example, the timing network node 300 may set an upper bound for N based on temperature variation associated with the timing hardware 330, and set a lower bound for N based on network jitter of the dedicated timing network 106. Based on the upper bound and lower bound, the timing network node 300 may select a value between the upper and lower bound as N. In some examples, when temperature variation increases, the timing network node 300 may decrease the upper bound for N. On the contrary, when the network jitter increases, the timing network node 300 may increase the lower bound for N. As such, the timing network node 300 may determine and adjust N based on constraints imposed by factors internal to the timing network node 300 (e.g., temperature variation of the timing hardware 330) and factors external to the timing network node 300 (e.g., network jitter of the dedicated timing network 106). The dynamic adjustment of N can ensure that N is small enough for the timing network node 300 to properly track the deviation of the hardware clock 334 and that N is large enough such that the estimation of the clock period of the hardware clock 334 will not be too adversely affected by the network jitter of the dedicated timing network 106.

Figure 5:
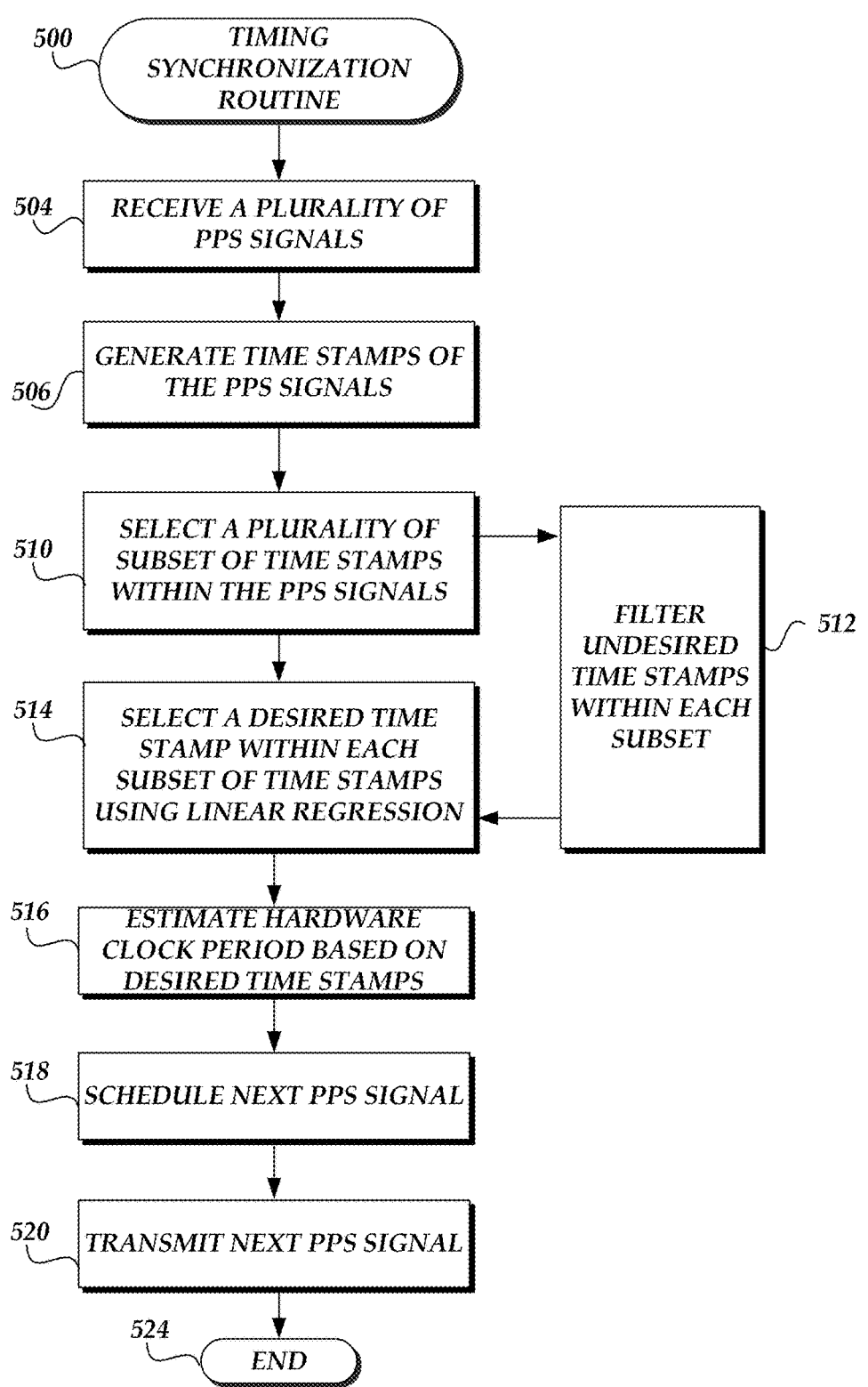
FIG. 5 illustrates an example routine for transmitting a next PPS signal to downstream nodes at a time instant scheduled according to estimated clock period drifts of a local oscillator of a node in a dedicated timing network.

With reference to FIG. 5, an illustrative routine 500 for transmitting a next PPS signal to downstream nodes at a time instant scheduled according to estimated clock period drifts of a local oscillator of a node in a dedicated timing network will be described. The routine 500 may be implemented, for example, by the timing network node 300 of FIG. 3. The routine 500 may allow the timing network node 300 to be synchronized with the downstream node 380 by estimating the period of the hardware clock 334. Specifically, the routine 500 may allow the timing network node 300 and the downstream node 380 receive PPS signals simultaneously.

The routine 500 begins at block 504, where the timing network node 300 receives a plurality of PPS signals from one or more upstream nodes. For example, the PPS transceiver 338 of the timing network node 300 may receive PPS signals from the upstream node 340. In some embodiments, though not illustrated in FIG. 3, the timing network node 300 may receive PPS signals from two or more upstream nodes. In some embodiments, the PPS transceiver 338 may receive any fixed-width timing signals and/or other signals defined by the dedicated timing network 106 for synchronizing the timing between the timing network node 300, the upstream node 340 and the downstream node 380. As discussed above, with the presence of network latency that may be varying, each of the PPS signals received by the timing network node 300 may not be received by exactly one second apart from each other, raising a challenge for achieving time synchronization among nodes in the dedicated timing network 106 through receiving upstream PPS signals and transmitting downstream PPS signals, which challenge can be dealt with by the routine 500.

At block 506, the timing network node 300 generates time stamps associated with the received upstream PPS signals. More specifically, the timing network node 300 may maintain a clock counter that counts once when the hardware clock 334 completes one cycle. The clock counter can be provided by the hardware clock 334 or other hardware components (e.g., the PPS transceiver 338 or the pulse set store 318) that reside in the timing network node 300. The generated time stamps can be stored in the pulse set store 318. For example, when a PPS signal is received from the upstream node 340 by the PPS transceiver 338, the value of the clock counter at the moment the PPS signal is received is stored in the pulse set store as a time stamp. By repeating this operation for each of the upstream PPS signals received, a plurality of time stamps can be generated and stored within the timing network node 300, where each time stamp represents a relative timing a corresponding upstream PPS signal is received. As such, each of the plurality of time stamps generated may record a point in time, according to the hardware clock 334, at which each of the plurality of PPS signals is received according to the hardware clock 334.

At block 510, at least two subsets of time stamps within the plurality of time stamps stored in the pulse set store 318 may be selected by the timing network node 300 for estimating the drift of the hardware clock 334. Specifically, the subset selector 312 can select two or more subsets from the generated and stored time stamps, where each subset includes certain number of consecutive time stamps stored in the pulse set store 318. In some examples, the subset selector 312 selects two or more subsets where each subset has certain number of time stamps, where each time stamp selected represents different, non-overlapping points in time according to the hardware clock 334. As discussed above, the number of time stamps within each selected subset may need to be sufficiently large (e.g., greater than 250 or other values) such that the timing network node 300 will not be forced to use "outlier" time stamps for estimating the period of the hardware clock 334.

At block 514, the timing network node 300 selects a desired time stamp within each of the at least two subsets of time stamps selected at block 510. In some embodiments, the timing network node 300 performs two steps to select a desired time stamp within a subset. In the first step, the pulse selector 316 generates a curve that fits time stamps in the subset of time stamps. For example, the pulse selector 316 may perform linear regression on the time stamps within the subset to generate a linear curve that fits and/or approximates the time stamps in the subset of time stamps. In the second step, the pulse selector 316 selects a time stamp based on a distance between the time stamp and a corresponding projecting point in the curve generated in the first step. For example, the pulse selector 316 may select a time stamp that has a minimum distance to its projection on the linear curve. If two or more time stamps have the same minimum distance, the pulse selector 316 may select the time stamp that is farther away from other selected subsets of time stamps. For example, if the subset selector 312 selects two subsets at block 510 where the first subset includes time stamps 1 to 250 and the second subset includes time stamps 751 to 1,000, the pulse selector 316 will select time stamp 900 rather than 800 from the second subset for estimating period of the hardware clock 334 when both time stamps 800 and 900 have a minimum distance to their projecting point on the curve that approximates time stamps 751 to 1,000.

In some embodiments, after selecting at least two or more subsets of time stamps at block 510, the routine 500 may optionally proceeds to block 512 before proceeding to block 514. If the routine 500 chooses to proceed to block 512, for each of the selected subsets, the timing network node 300 may remove some of the time stamps from further analysis at block 514. For example, at block 512, the pulse filter 314 may remove "outlier" time stamps from being used to generating the fitting curve based on the criterion discussed above, such as the hardware specification (e.g., the maximum frequency deviation) of the hardware clock 334 and/or the latency between the timing network node 300, the upstream node 340 and the downstream node 380. Advantageously, the filtering performed by the pulse filter 314 prevents the pulse selector 316 to select time stamp within a subset that does not well reflect the clock drift of the hardware clock 334.

At block 516, the timing network node 300 calculates an estimated period of the hardware clock 334 based on the time stamp selected at block 514 from each subset of time stamps of the at least two subsets of time stamps selected at block 510. For example, if the $900^{th}$ time stamp from the fourth subset and the $100^{th}$ time stamp from the first subset are selected by the pulse selector 316, the clock period estimator 322 can estimate the period of the hardware clock 334 by calculating the inverse of $(C_{900}-C_{100})/800$, where $C_{900}$ represents the (clock counter) value of the $900^{th}$ time stamp stored in the pulse set store 318, Cioo represents the value of the $100^{th}$ time stamp stored in the pulse set store 318 and 800 represents the difference between the order of the $100^{th}$ and $900^{th}$ time stamps.

At block 518, the timing network node 300 schedules a time instant for transmitting the next PPS signal based at least on the estimated period of the hardware clock 334. In some embodiments, the PPS scheduler 320 can schedule the next PPS signal to be sent to the downstream node 380 based on the estimated period of the hardware clock 334. For example, the PPS scheduler 320 may schedule the next downstream PPS signal based on the estimated clock period of the hardware clock 334, the time instant the latest upstream PPS signal is received from the upstream node 340 and the network delay between the timing network node 300 and the downstream node 380. More specifically, the PPS scheduler 320 may schedule the next PPS signal to be transmitted to the downstream node 380 at the time instant when the clock counter described at block 506 equals $C_{rcv}+1/(p(t))-d/(p(t))$, where $C_{rcv}$ is the value of the clock counter when the latest upstream PPS signal is received from the upstream node 340, $1/(p(t))$ represents the number of an estimated clock cycle that make up one second, and $d/(p(t))$ represents the number of an estimated clock cycle that make up the network delay d between the timing network node 300 and the downstream node 380.

At block 520, the timing network node 300 transmits the next PPS signal at the scheduled time instant to the downstream node 380. Specifically, the PPS transceiver 338 may transmit the next PPS signal to the downstream node 380 based on the time instant provided by the PPS scheduler 320. Continuing the example scheduling calculation discussed at block 518, by transmitting the next PPS signal at the time instant when the value of the clock counter equals $C_{rcv}+1/(p(t))-d/(p(t))$, the downstream node 380 would receive the next PPS signal when the value of the clock counter equals $C_{rev}+1/(p(t))$ due to the presence of network delay. In addition, the timing network node 300 may also receive the next upstream PPS signal from the upstream node 340 at the time instant when the value of the clock counter equals $C_{rev}+1/(p(t))$ because two consecutive PPS signals should be received by the timing network node 300 by one second apart. Advantageously, based on the scheduled time instant for transmitting the next PPS signal, the timing network node 300 and the downstream node 380 receive PPS signals simultaneously such that the two nodes may have the same notion of time.

After implementing the aforementioned blocks, thus achieving a same notion of time among the timing network node 300 and the downstream node 380 by letting these two nodes receive PPS signals simultaneously, the routine 500 ends at block 524. If the routine 500 is executed by the timing network node 300 of FIG. 3, after the routine 500 ends at block 524, both the timing network node 300 and the downstream node 380 will receive a next PPS signal simultaneously. As such, the timing network node 300 and the downstream node 380 can have a same notion of time based on the PPS signals they receive.

Figure 6:
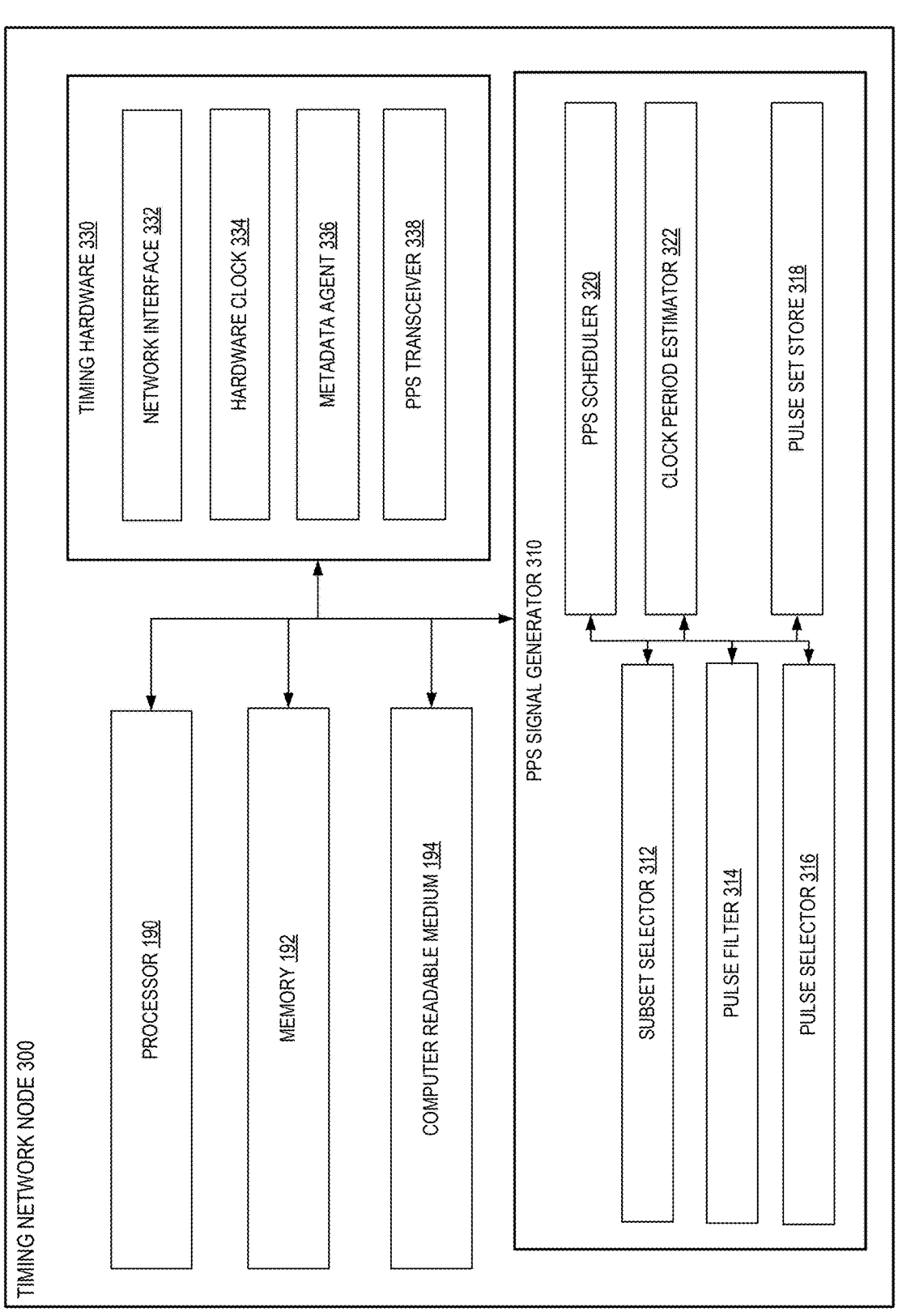
FIG. 6 depicts a general architecture of a computing device or system generating synchronized timing signals in accordance with aspects of the present disclosure.

FIG. 6 depicts an example architecture of a computing device (referred to as the timing network node 300) that can be used to perform one or more of the techniques described herein or illustrated in FIGS. 1-5. The general architecture of the timing network node 300 depicted in FIG. 6 includes an arrangement of computer hardware and software modules that may be used to implement one or more aspects of the present disclosure. The timing network node 300 may include many more (or fewer) elements than those shown in FIG. 6. It is not necessary, however, that all of these elements be shown in order to provide an enabling disclosure. As illustrated, the timing network node 300 includes a processor 190, a memory 192, a computer readable medium 194, a timing hardware 330 (including a network interface 332, a hardware clock 334, a metadata agent 336, a PPS transceiver 338), and a PPS signal generator 310 (including a pulse set store 318, a subset selector 312, a pulse filter 314, a pulse selector 316, a clock period estimator 322, and a PPS scheduler 320), all of which may communicate with one another by way of a communication bus. The network interface 332 may provide connectivity to one or more networks or computing systems, such as other nodes in the dedicated timing network 106. The processor 190 may thus receive information and instructions from other computing systems or nodes in the dedicated timing network 106 illustrated in FIG. 1 and/or the dedicated timing network 106 illustrated in FIG. 2.

The processor 190 may also communicate with memory 192. The memory 192 may contain computer program instructions (grouped as modules or units in some embodiments) that the processor 190 executes in order to implement one or more aspects of the present disclosure. The memory 192 may include random access memory (RAM), read only memory (ROM), and/or other persistent, auxiliary, or non-transitory computer-readable media. Additionally, the memory 192 can be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). The memory 192 may store an operating system (not shown in FIG. 6) that provides computer program instructions for use by the processor 190 in the general administration and operation of the timing network node 300. The memory 192 may further include computer program instructions and other information for implementing one or more aspects of the present disclosure.

The network interface 332 may commonly support one or more wireless networking protocols (e.g., Wi-Fi/IEEE 802.11, or another wireless networking standard). However, in various embodiments, network interface 332 may support communication via any suitable wired or wireless general data networks, such as other types of Ethernet networks, for example. Additionally, network interface 332 may support communication via telecommunications/telephony networks such as analog voice networks or digital fiber communications networks, via storage area networks such as Fibre Channel SANs, or via any other suitable type of network and/or protocol.

As discussed above, the timing network node 300 may schedule a next PPS signal for a downstream node in a dedicated timing network based on PPS signals received from one or more upstream nodes. As shown in FIG. 6, the timing network node 300 includes timing hardware 330, which can be implemented as a hardware isolated from other hardware of the timing network node 300. For example, the timing hardware 330 may be implemented as an expansion card, an offload card or a dongle of the timing network node

300. The timing network node 300 can thus include the timing hardware 330 and the PPS signal generator 310. The PPS signal generator 310 can estimate a clock period of the hardware clock 334 based on statistical analysis performed by the pulse set store 318, the subset selector 312, the pulse filter 314, the pulse selector 316, the clock period estimator 322, and the PPS scheduler 320 as described in FIGS. 3, 4A-4B and 5. Based on the estimated clock period of the hardware clock 334, the PPS transceiver 338 may schedule and transmit a next downstream PPS signal such that a downstream node and the timing network node receive PPS signals simultaneously.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, micro-controller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for synchronizing time among nodes of a dedicated timing network, the system comprising:

an upstream node configured to transmit a plurality of pulse-per-second (PPS) signals to a local node;

a downstream node configured to receive at least a next PPS signal from the local node; and the local node, wherein the local node has a hardware clock susceptible to clock period drift, and wherein the local node is configured to:

receive the plurality of PPS signals from the upstream node;

generate a plurality of time stamps, each of the plurality of time stamps recording a point in time, according to the hardware clock, at which each of the plurality of PPS signals is received according to the hardware clock;

select at least two subsets of time stamps within the plurality of time stamps, the at least two subsets of time stamps respectively including time stamps at different, non-overlapping points in time according to the hardware clock;

for each subset of time stamps of the at least two subsets of time stamps:

generate a curve that fits time stamps in the subset of time stamps; and select a time stamp based at least on a distance between the time stamp and a corresponding projecting point in the curve;

calculate an estimated period of the hardware clock based on the time stamp selected from each subset of time stamps of the at least two subsets of time stamps;

schedule a time instant for transmitting the next PPS signal based at least on the estimated period of the hardware clock; and transmit the next PPS signal at the time instant to the downstream node.

2. The system of claim 1, wherein the curve is a linear curve generated by a linear regression approximation on the time stamps in the subset of time stamps.

3. The system of claim 1, wherein the local node is further configured to filter each subset of time stamps based at least on a hardware specification of the hardware clock prior to generation of the curve.

4. The system of claim 1, wherein a number of time stamps within the plurality of time stamps is determined based on a network jitter of the dedicated timing network and a hardware specification of the hardware clock.

5. A node in a timing network, wherein the node is configured to receive a plurality of synchronization signals from at least one upstream node in the timing network, the node comprising:

a hardware clock; and a processor configured to:

generate a plurality of time stamps, each of the plurality of time stamps recording a point in time, according to the hardware clock, at which each of the plurality of synchronization signals is received;

select two subsets of time stamps within the plurality of time stamps, the at least two subsets of time stamps respectively including time stamps at different, non-overlapping points in time according to the hardware clock;

select two time stamps from the two subsets of time stamps, the two time stamps being apart from each other in order within the plurality of time stamps beyond a threshold distance; and calculate an estimated period of the hardware clock based on the two time stamps.

6. The node of claim 5, wherein the threshold distance is determined at least based on a network jitter of the timing network and a hardware specification of the hardware clock.

7. The node of claim 5, wherein the node selects one of the two time stamps from one of the two subsets of time stamps based on a curve that approximates time stamps in the one of the two subsets of time stamps.

8. The node of claim 7, wherein the curve is a linear curve generated by a linear regression approximation on the time stamps in the one of the two subsets of time stamps.

9. The node of claim 7, wherein the processor is further configured to:

filter each of the two subsets of time stamps based at least on a hardware specification of the hardware clock prior to generation of the curve.

10. The node of claim 5, wherein the processor is further configured to dynamically adjust a number of time stamps in each of the two subsets of time stamps based on at least a network jitter of the timing network, an operating temperature of the hardware clock, or an operating time of the hardware clock.

11. The node of claim 5, wherein the processor is further configured to schedule a time instant for transmitting a next synchronization signal to a downstream node in the timing network based at least on the estimated period of the hardware clock and a time interval between each of the plurality of synchronization signals.

12. The node of claim 11, wherein the time instant is scheduled further based on a latency between the node and the downstream node.

13. The node of claim 12, wherein the node transmits the next synchronization signal to the downstream node at the time instant.

14. The node of claim 5, wherein each of the plurality of synchronization signals is a pulse-per-second (PPS) signal.

15. A computer-implemented method implemented at a node in a timing network, the node including a hardware clock and a processor configured to estimate a clock period drift, wherein the method comprises, by the processor:

generating a plurality of time stamps, each of the plurality of time stamps recording a point in time, according to the hardware clock, at which each of a plurality of synchronization signals is received from an upstream node in the timing network according to the hardware clock;

selecting two subsets of time stamps within the plurality of time stamps, the two subsets of time stamps respectively including time stamps at different, non-overlapping points in time according to the hardware clock;

selecting two time stamps from the two subsets of time stamps, the two time stamps being apart from each other in order within the plurality of time stamps beyond a threshold distance; and calculating an estimated period of the hardware clock based on the two time stamps.

16. The computer-implemented method of claim 15, wherein a number of time stamps within the plurality of time stamps is determined based on a network jitter of the timing network and a hardware specification of the hardware clock.

17. The computer-implemented method of claim 15, further comprising:

scheduling a time instant for transmitting a next PPS signal to a downstream node in the timing network based at least on the estimated period of the hardware clock and a time interval between each of the plurality of synchronization signals.

18. The computer-implemented method of claim 17, wherein the time instant is scheduled further based on a latency between the node and the downstream node.

19. The computer-implemented method of claim 15, wherein each of the plurality of synchronization signals is a fixed-width signal.

20. The computer-implemented method of claim 15, further comprising:

filtering each of the two subsets of time stamps based at least on a hardware specification of the hardware clock prior to selecting the two time stamps from the two subsets of time stamps.

* * * * *